US005544983A

United States Patent [19]

Taguchi

[11] Patent Number: 5,544,983

[45] Date of Patent: Aug. 13, 1996

[54] METHOD OF TRANSFERRING MATERIAL FROM THE BOTTOM OF A BODY OF WATER

[75] Inventor: Akira Taguchi, Osaka, Japan

[73] Assignee: Mori-Gumi Co., Ltd., Osaka, Japan; a part interest

[21] Appl. No.: 269,477

[22] Filed: Jun. 30, 1994

Related U.S. Application Data

[62] Division of Ser. No. 55,790, May 3, 1993, Pat. No. 5,364,208, which is a continuation of Ser. No. 919,391, Jul. 29, 1992, abandoned, which is a continuation of Ser. No. 476,425, filed as PCT/JP89/00945, Sep. 14, 1989, abandoned.

[30] Foreign Application Priority Data

Sep. 19, 1988 [JP] Japan .................................. 63-234588

[51] Int. Cl.$^6$ ...................................................... B65G 53/36

[52] U.S. Cl. ................................ 406/85; 37/317; 37/324; 299/9; 406/109; 406/120; 406/136; 406/146; 406/151

[58] Field of Search ................................ 406/10, 12, 16, 406/17, 19, 21, 23, 24, 25, 28, 29, 30, 31, 32, 33, 85, 108, 109, 135, 136, 137, 146, 151, 154, 120; 37/307, 317, 320, 324, 342, 343, 299, 406, 120; 299/8, 9

[56] References Cited

U.S. PATENT DOCUMENTS

| | | | |
|---|---|---|---|
| 1,600,505 | 9/1926 | Hunter | 417/122 |
| 2,077,898 | 4/1937 | Rolff | 406/120 X |
| 3,005,417 | 10/1961 | Swaney | 417/125 |
| 3,082,698 | 3/1963 | Smith | 417/142 |
| 3,328,089 | 6/1967 | Hodgson et al. | 406/197 |
| 3,333,901 | 8/1967 | Hodgson et al. | 406/197 X |
| 3,552,884 | 1/1971 | Faldi | 417/122 |
| 3,689,045 | 9/1972 | Coulter et al. | 406/120 X |
| 3,753,303 | 8/1973 | Holzenberger et al. | 406/109 X |
| 3,762,773 | 10/1973 | Schroeder | 406/146 X |
| 3,829,246 | 8/1974 | Hancock | 417/121 |
| 3,864,060 | 2/1975 | Hall, Jr. et al. | 417/36 |
| 3,883,269 | 5/1975 | Wolff | 417/122 |
| 3,929,261 | 12/1975 | Solimar | 406/137 X |
| 4,111,492 | 9/1978 | Mraz | 406/120 |
| 4,381,897 | 5/1983 | Arbeletche et al. | 406/120 X |
| 4,408,960 | 10/1983 | Allen | 417/54 |
| 4,496,076 | 1/1985 | Tompkins | 406/137 X |
| 4,507,056 | 3/1985 | Allen | 417/54 |
| 4,524,801 | 6/1985 | Magnasco et al. | 137/567 |
| 4,685,840 | 8/1987 | Wolff | 406/120 X |
| 4,765,779 | 8/1988 | Organ | 406/106 |
| 4,818,187 | 4/1989 | Scampini | 417/137 |
| 4,938,637 | 7/1990 | Lybecker et al. | 406/146 X |

FOREIGN PATENT DOCUMENTS

| | | | |
|---|---|---|---|
| 2239831 | 4/1973 | Germany | 299/9 |
| 3439251 | 4/1986 | Germany | 406/120 |
| 54-113176 | 9/1979 | Japan | 406/120 |

(List continued on next page.)

*Primary Examiner*—Andrew C. Pike
*Attorney, Agent, or Firm*—Wenderoth, Lind & Ponack

[57] ABSTRACT

A method of transferring material from the bottom of a body of water provides a first tank submerged at a predetermined depth above the bottom. A material source is provided at the bottom subject to ambient water pressure, and is fluidly connected with the first tank. Material is transferred from the material source to the first tank by reducing the pressure in the first tank below the ambient water pressure at the predetermined depth. The ambient water pressure at the bottom thus forces the material into the first tank. Material is transferred from the first tank to a second tank under the force of compressed air until the first tank is substantially empty of material and full of compressed air. The first tank is connected to a third tank and an air compressor, the material transfer from the first tank to the second tank taking place by the compressor transferring compressed air to the first tank from the third tank. The material from the material source is transferred by having the compressed air in the first tank transferred to the third tank in order to reduce the pressure in the first tank. These steps can be carried out sequentially to continuously transfer material. A fourth tank can be provided with compressed gas to provide additional compressed air for transfer as well as a source of air for stirring the material in the first tank.

14 Claims, 12 Drawing Sheets

FOREIGN PATENT DOCUMENTS

| | | | |
|---|---|---|---|
| 54-137111 | 10/1979 | Japan . | |
| 55-145929 | 11/1980 | Japan | 406/120 |
| 56-113616 | 9/1981 | Japan | 406/197 |
| 59-36027 | 2/1984 | Japan . | |
| 59-172328 | 9/1984 | Japan | 406/197 |
| 61-1900 | 1/1986 | Japan . | |
| 1207942 | 1/1986 | U.S.S.R. | 406/120 |
| 1402518 | 6/1988 | U.S.S.R. | 406/146 |
| 1418215 | 8/1988 | U.S.S.R. | 406/197 |
| 1421645 | 9/1988 | U.S.S.R. | 406/197 |
| 1525339 | 11/1989 | U.S.S.R. . | |
| WO87/05586 | 9/1987 | WIPO | 406/106 |

METHOD OF TRANSFERRING MATERIAL FROM THE BOTTOM OF A BODY OF WATER

This is a Rule 60 divisional application of U.S. Ser. No. 08/055,790, filed May 3, 1993, now U.S. Pat. No. 5,364,208, which is a continuation of U.S. Ser. No. 07/919,391 filed Jul. 29, 1992, now abandoned, which is a continuation of U.S. Ser. No. 07/476,425 filed Sep. 14, 1989, now abandoned, which is the National stage of International Application No. PCT/JP89/00945.

TECHNICAL FIELD

This invention relates to a method of transferring objects with compressed air and, more particularly, to a method of transferring objects by pressure which transfers, with stirring if necessary, such objects as water, sludge-like liquids (such as fertilizers and mud), deposits including sand and pebbles at water bottoms and submarine oil, and which is applicable for such uses as spreading of fertilizers, dredging of water bottoms, gathering of minerals from the same, and extracting crude oil from submarine oil fields.

BACKGROUND ART

Conventionally, pumps have been used to draw up from lower levels or push up to higher levels regular liquids or liquids which include viscous substances or solid substances such as sand and pebbles. Various types of pumps have been developed in accordance with the type and nature of the objects to be transferred; however, there have been a number of problems. Namely, they are not applicable for all purposes; rather their applicability is limited to each specific purpose; they are expensive; the transferable distance is short; the transferable quantity of liquid is small; and they consume much energy.

Therefore, it is necessary to connect many pumps, like relay stations, in order to draw up liquid from more than several hundred meters below ground level, or to push it up several hundred meters above the ground level. In addition to the height and the depth, the extent of the area to which the liquid is supplied affects the number of the pumps. Many pumps are inevitably required in order to supply liquids to many points extending over a wide area. To construct special kinds of pumps, or to increase the number of pumps, invites an additional investment compared with the use of only one motor, as well as increased equipment costs. Particularly in the case of liquid which contains sludge or solid substances, mechanical durability is decreased because the structure of the pump allows viscous or solid substances to enter its mechanism, which leads to frequent repairs and replacement of components caused by breakdown and wear. Besides, pumps are helpless against freezing of the liquid contained in the pumps themselves.

Pumps have played a great role in displacing various liquids, thereby providing them with potential energy. It is not too much to say that man has been completely dependent on pumps. Pumps, however, have the problems as stated above. Stated in relation to this invention, these problems are as follows.

(1) Pumps which draw up or push up liquids which contain viscous or solid substances are, in general, expensive and have high operating costs, and their transferable distance is short. For this reason, when spreading a large quantity of liquid over a wide area along the slopes of mountains higher than several hundred meters, or when flowing back a large quantity of water to an upper reservoir utilizing excess electricity during the night at hydroelectric power plants, or when removing or gathering sand and pebbles or other deposits on water bottoms, it becomes necessary to operate a large pump, or many pumps, like relay stations, and since breakdown of one unit damages the operation of the whole system, sophisticated instrumentation is required, including measures against breakdown, which necessitates large expenditures on the equipment. Whenever pumps are used, these are unavoidable problems.

(2) Particularly when drawing up or pushing up liquids containing viscous or solid substances, repairs and replacement of components are necessary due to breakdown or wear in the mechanism, and the mechanical durability is decreased because the mechanical structure of pumps allows the substances to run against the pump mechanism through which the liquids flow. (3) In the winter season, lagging and heating are required for pumps and connected pipes in order to prevent freezing. At present, there have been provided no effective freeze-prevention measures for pumps and pipes to be installed over a wide area, so that pumps and connected pipes often burst or get damaged by a cold wave, thereby causing the operation to halt. Complete freeze-prevention is not currently realistic because of the excessive costs involved. In order to resolve these problems, it is necessary to move away from pumps that include a mechanical structure which acts on the liquids directly to draw up or push up the liquids, and to establish novel transfer methods and equipment based upon a new concept.

SUMMARY OF THE INVENTION

Accordingly, it is the object of the present invention to provide a novel transfer method utilizing air as a transferring medium wherein the transferred objects do not receive a direct mechanical action, but receive potential energy given by the air pressure of compressed air and further the air pressure used for transfer can be used repeatedly and continuously for further transfer, thereby providing a novel transfer method which can transfer any kind of object smoothly at low cost and without any mechanical trouble, and which is also applicable to the dredging of water bottoms, the gathering of minerals from the same, and extracting submarine oil.

The air to be used in the present invention as the energy source is inexhaustible in the atmosphere, and therefore no cost problems occur, and since it is light and less affected by gravity than liquid, when used as an air pressure which acts on a transferred object, gravity problems can be resolved almost effortlessly. Therefore, the action of air can be transferred freely over a wide area within the atmosphere and can provide potential energy to objects at any place. Due to their mechanical structure, pumps operate directly on liquids to be transferred. Since the above-mentioned problems occur because of the direct action, the present invention interposes a medium between an object to be transferred and a mechanism. As for the medium, air is supreme because of its purity, simplicity, flexibility and freedom from gravitational influence.

When air is used as a medium, a transferring system is free from mechanical complications and friction or impact problems, and then there occur few troubles. Furthermore, the energy which has been used for transfer action can be retained and used repeatedly and continuously when air valves are controlled electronically to open and close in precise manner. As a result, the efficiency is greatly increased. In accordance with an operational manner, it is possible to come close to isothermal compression, whereby it is theoretically possible to achieve efficiency extremely close to 100%.

The present invention provides a novel transfer method and apparatus utilizing air, precisely compressed air, wherein objects are transferred by potential energy given by the air pressure of compressed air and the compressed air used for transfer is retained as a replacement for the objects at the place where the objects are transferred from, so that the compressed air may be used repeatedly and continuously as the energy for transfer.

Further, there is provided a transfer method wherein the compressed air retained at the place where the objects have been transferred from to the next place in a previous stage is forced into the next place by using a compressor, thereby providing the transferred objects with further potential energy and transferring the same to yet another place, and the compressed air used for the transfer is retained as a replacement for the objects at the place where the objects have been transferred from, so that the compressed air may be used repeatedly and continuously as the energy for transfer.

Moreover, the present invention provides a transfer method wherein the objects are replaced by compressed air at the origin of transfer and transferred to the next place, and further, objects are brought into a place where the compressed air was retained and such replacement between the objects and compressed air is repeated cyclically. Such a transfer method can continuously transfer large quantity of objects to the next place, e.g., a higher place.

Further, the present invention provides a transfer method wherein the objects are placed by compressed air both at the origin of transfer and at a transferred place and transferred respectively to a next place, and further objects are brought into a place where the compressed air was retained, and such a replacement between the objects and compressed air is cyclically repeated at a respective place.

Also, where there is water pressure, as in the case of the dredging of water bottoms, a more effective transfer method is provided utilizing the water pressure in accordance with the present invention. Namely, it is a method of transfer conducting the alternative replacement between the objects and compressed air, wherein the objects are brought into a place by the water pressure where the compressed air acts on the objects.

Now, the principles used in this invention are explained below.

(1) Trichery's Vacuum Tube

The first principle used is the principle of Trichery's vacuum tube. The height of a mercury column is 76 cm under 1 atm. Since the density of mercury is 13.59, when a water column is used instead of a mercury column, the column height is approximately 10 m under the same pressure, from the calculation 76 cm×13.59=10 m 33 cm. Accordingly, if a pressure tank is filled with water and pressurized with 10 atm., the water goes up to the height of 100 m (10 m×10=100).

(2) Boyle's Law

The second principle used is Boyle's law. Namely, at a given level of temperatures, the volume of gas (V) is inversely proportional to the absolute pressure (P). And the product of the pressure of gas of a given mass and its volume is fixed (P×V=fixed). This principle is also necessary for calculation in respect to control.

(3) Principles of Air Pressure

The third principle used is the principle of air pressure. Air pressure is wave motion. It travels at the velocity of 340 m per second. The difference in the potential energy of air is negligible within a vertical range of several hundred meters. In other words, it does not posses weight in comparison with liquid. Within the "weightless" range, operational air can be freely moved with no regard to potential energy. The above nature is called herein the "principle of air pressure". Suppose, for example, a pressure tank is filled with compressed air up to the gauge reading of 10 atm at ground level. The energy that the compressed air gives the water in a tank place 600 m high above the ground, and the energy it gives to the same amount of water at ground level, or that the air gives to water at the bottom of a pit 500 m below the ground, are the same, and in any of these cases, the compressed air can give the energy to the water within a period as short as two seconds. In other words, the air can create a 100 m water column regardless where the tank is located. This proposition, of course, ignores the length of connecting pipe between the pressure tank and the tanks filled with water. But since in the case of continuous operation the air and liquids existing in the pipe can pass on their potential energy, the length and diameter of the pipe can be almost ignored.

Now a comparison is made between the present method and pumps.

Although there exist pumps which push up liquid using compressed air, and those which suck up liquid with negative pressure, the present method is not any kind of pump. It is a novel transfer method where the whole energy used for the transfer of liquid is retained by an electronic control, and is repeatedly used for another transfer, and which can transfer objects by the transmission of energy in a long span, taking advantage of the fact that the energy source, i.e., the compressed air, receives little gravitational influence under the normal atmospheric pressure, and is able to fully utilize buoyancy and differences in air pressure or water pressure with the use of pressure tanks, a compressor and control devices. A booster compressor is desirable for the compressor to be used.

In order to use air as a medium for transfer and to compress it for making it available as an energy source, it is necessary to prepare compressed air with a compressor. When retaining the whole compressed air which has been used to push up liquid and repeatedly use the compressed air as the energy source, the compression to be made therein is not the compression of air under the normal atmospheric pressure as in the first compression. Namely, there is conducted an intake-compression-delivery of the compressed air having a pressure given by the first compression. Thus since from the second compression on, it is not air from the atmosphere but already compressed air that is compressed and delivered, the use of a booster compressor is desired. When a booster compressor takes in high-pressure compressed air, the air accelerates the motor and electricity is generated. The actual input value is below the calculated value, i.e. [√3)×(force ratio of the motor)×(rated current)×(voltage)], and the consumption of electricity is minimized to the same degree. Efficiency extremely close to 100% is theoretically possible with this saving. On the other hand, the mechanical structure of the compressor allows leaks or blow-by of a small amount of air due to the clearance between the piston and the cylinder. Then it is difficult to utilize 100% of the retained energy for the next transfer operation. However the loss of blow-by has been reduced to a minimum by the improvement of the device.

Appliances and instruments used in the present method are free from failure or wear, and thus their durability can be greatly improved.

Because the present method uses air as a medium and compressed air as an energy source, and retains the energy for repeated continuous use with appropriate control, there is no mechanical structure in the path of the liquid. Any liquid containing viscous or solid substances which can pass through valves and pipes can be transferred without making contact with the mechanism, so that mechanical failure or wear cannot occur, and a great increase in durability can be achieved, as well as a significant reduction in the necessity to take measures against failure or accidents. The compressed air can be used not only as an energy source and for operational control, but also for other purposes, such as stirring of liquids, application as a bubble pump, or freeze prevention. For operational purposes, cylinder valves are very often used, however, since this method handles high-pressure air and liquids with viscous or solid substances, such operational devices as rotary actuators, electromagnetic valves, and ball valves are preferred to be used. Such operations as opening or closing the ball valves at the instant when the liquids pass through them can prevent the occurrence of failure completely.

The present method using air as a medium and compressed air as an energy source includes in itself anti-freeze measures for the winter season. Since it does not have mechanisms such as pumps, and the passage of liquid comprises valves and pipes only, where there is a risk of freezing in the winter, residual liquid in the valves and pipes can be completely blown out if compressed air is sent through the passages for a short period of time after a transfer operation. Therefore, even in an extremely cold climate where the temperature goes 10 degrees below zero, this method makes it possible to transfer liquid without any trouble.

BEST MODE FOR CARRYING OUT THE INVENTION

A more detailed explanation of the invention is given below along with the attached drawings.

Embodiment 1—Atmospheric Pressure Operation

Figure 1:
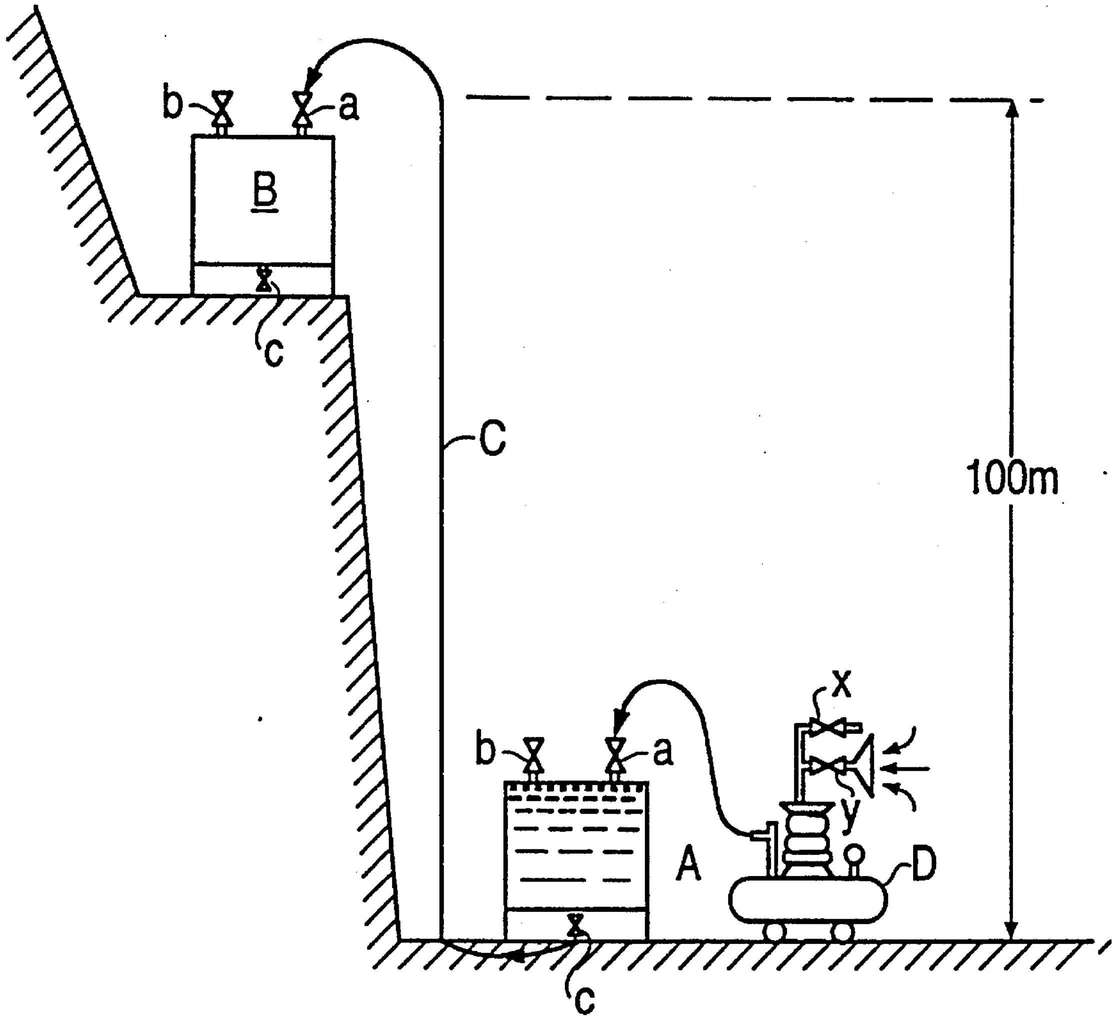
FIG. 1 illustrates a basic embodiment of the transfer method in accordance with the present invention showing Atmospheric Pressure operation.

FIG. 1 illustrates a basic embodiment of the transfer method in accordance with the present invention which is called Atmospheric Pressure Operation.

A pressure tank (first tank) A with a capacity of 1 $m^3$ is placed on the ground and filled with water. An empty tank (second tank) B with the same capacity is placed at a level of 100 m above the ground and connected with a pipe C as illustrated. Each tank has three electrically-operated valves a, b, and c. A compressor D has two valves x and y. The valve x takes air higher in pressure than the atmosphere, namely, compressed air, and the valve y takes air of the pressure level equal to or lower than the atmospheric pressure. In the drawing, the valves a and c of the first tank A are open and the valve b is closed. The valves a and b of the second tank B are open and the valve c is closed. Therefore, the second tank B is open to the atmosphere. The valve x of the compressor D is closed and the valve y is open. When the compressor takes air from the atmosphere to compress it and delivers the compressed air into the first tank A which is placed on the ground and filled with water, in compliance with Trichery's principle of vacuum tubes mentioned above, the water rises in the 100 m pipe C and reaches the valve a of the second tank B when the gauge pressure reaches 10 atm. With pressure somewhat higher than 10 atm continuously added, the water gradually flows into the second tank B and finally all of the water flows into the second tank B. Electronically sensing this instant, the valve b of the second tank B is close. Now, 1 $m^3$ of water has been transferred up to the height of 100 m with the Atmospheric Pressure Operation. If pumps were used to achieve the same result, a multi-step pump with eight steps or so would be needed, assuming the object is pure water.

In Atmospheric Pressure operation, the valve b of the second tank B is closed electronically detecting the instant when the 1 $m^3$ of water has been sent up into the second tank B, and the compressor is also stopped. If the air pressure in the first tank A is a little over the atmospheric pressure plus 10 atm, all the water can be pushed up. By closing the valve b of the tank B at the instant all the water has been pushed up into the tank B, i.e., in the instant of water has been pushed up to the height of 100 m, the energy inside the tank A becomes maximum and is retained in a reusable form of 1 $m^3$ of compressed air with 10 atm gauge pressure. The air in this condition can do a considerable amount of work when isothermally expanded, and from now on this capability is called 'active power'. Though a pump can push or draw up 1 $m^3$ of water into the tank B, its active power disperses in the transfer process at the instant the work is completed and is not retainable. In the Atmospheric Pressure transfer, however, the active power which sends up the water and reaches its maximum in the process is fully retained for another transfer, and the active power which is used for another transfer and reaches the maximum is further retained for yet another transfer. Thus the active power can be used repeatedly and continuously for transferring the water. Moreover, the active power used for the second transfer is quite large and strong because it has reached its maximum energy level at the end of the first operation. According to the principle of air pressure, this energy can be freely transferred at the velocity of 340 m per second to any place within a three-dimensional area of several hundred meter distance as potential energy for the conveyance of water. It is explained in the next section of Natural Pressure Operation just how powerful the 1 $m^3$ compressed air is at 100 atm gauge pressure retained after the transfer of 1 $m^3$ water to the height of 100 m.

Embodiment 2—Natural Pressure Operation.

As explanation about Natural Pressure operation, which is related to the above Atmospheric Pressure operation, is given below along with FIG. 2.

Figure 2:
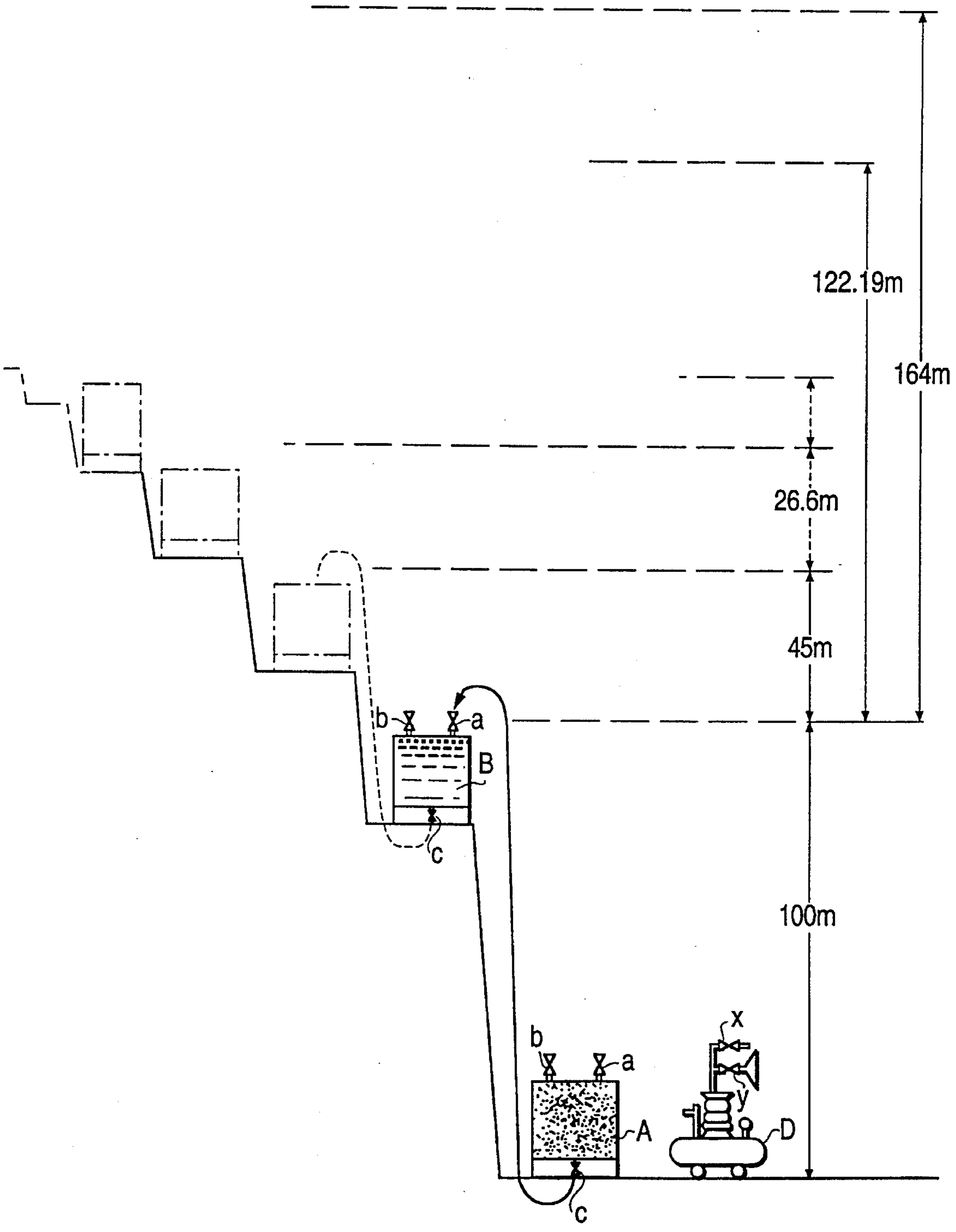
FIG. 2 illustrates another basic embodiment of the transfer method in accordance with the present invention showing Natural Pressure operation.

FIG. 2 shows the stage where the water is completely pushed up into the second tank B by sending the compressed air of the compressor into the first tank, which is filled with water. The tank A is then filled with compressed air having a gauge pressure of a little higher than 10 atm, and the second tank B is filled with water displaced from the tank A. Also, FIG. 2 shows another tank in dotted lines at a level 45 m higher than the tank B. According to the "principle of air pressure" explained in (3) above, the compressed air in-the tank A which has a gauge pressure of a little higher than 10 atm is acted against the water in the tank B of 100 m above the ground. To do so, it is necessary only to open the valve c of the tank A. It is not necessary to operate the compressor. All the water in the tank B should be transferred up to the third tank, but the transfer height is 45 m.

The atmospheric pressure (1 atm at the standard atmosphere) is often ignored when phenomena are observed in the atmosphere. If a pressure gauge indicates 10 atm in the atmosphere, 10 atm is only the gauge pressure, while the actual total pressure is 11 atm at the standard atmosphere. Accordingly, the compressed air which is filled in the first tank and has a pressure of a little higher than the atmospheric pressure plus 10 atm has a pressure of a little higher than 11 atm in the standard atmosphere. In other words, because a pressure which slightly exceeds 11 absolute atm has been applied to the water in the first tank set on the ground, all the 1 $m^3$ of water has been sent up into the second tank of 100 m above the ground.

If the applied pressure is 11 atm, the maximum transfer distance is 100 m under the standard atmospheric pressure, because of the calculation, 10 m/atm×(11-1)atm. If a pressure of a little higher than 5.5 atm pushes up the 1 $m^3$ water under the standard atmosphere, then the maximum transfer distance is 45 m, according to the calculation, 10 m/atm×(5.5-1)atm. Now, Boyle's Law mentioned in part (2) above comes into play here: "At a given temperature, the product of pressure and volume of a gas of a given mass is fixed." According to this law, since the pressure in the first tank is approximately 11 atm and its volume is 1 $m^3$ the fixed products is 11 with the formula, PV=11 atm×1 $m^3$ =11 (atm.$m^3$). When all the water in the second tank has been transferred to the third tank, the total volume of empty tanks A and B is 2 $m^3$ (1 $m^3$ +1 m). When these figures are applied in the formula PV=P'V'=11 (fixed), P'×2=11 and therefore P'=11/2=5.5 can be obtained. Then, the pressure inside both the tank A and the tank B is 5.5 atm. Since the transfer distance under this pressure is 45 m as explained above, the water in the tank B has been pushed up into the third tank 45 m above.

The compressed air retained in the tank A and used as an energy source has possessed the maximum active power which was stored after transferring up the 1 $m^3$ water in the tank A into the tank B 100 m above. By merely opening a valve, another 45 m transfer has been achieved. At the same time, compressed air of 5.5 atm is retained in the total 2 mof the tank A and the tank B. Now, Natural Pressure operation is defined as an operation where the active power works in itself, merely through opening and closing of the valves without any force applied from outside such as by compressors. It is possible to combine Atmospheric Pressure operation in Embodiment 1 and this Natural Pressure operation. For example, when providing the aforementioned 1 $m^3$ of water with potential energy to transfer it 100 m, Atmospheric Pressure operation required the compressed air of 10 atm gauge pressure, however, when combined with Natural Pressure operation, it is possible to transfer the water up to the 70 m level with 7 atm compressed air in Atmospheric Pressure operation, and to use Natural Pressure operation for the remaining 30 m.

$$[PV=(7+1)\times 1=8,\ P'\times 2=8,$$

$$P'=8/2=4,\ 10\ \mathrm{m}(4-1)=30\ \mathrm{m}]$$

Thus, it is more efficient to transfer the water up to 70 m in Atmospheric Pressure operation and to apply Natural Pressure operation for the remaining 30 m up to the total of 100 m.

As mentioned above, in Natural Pressure operation, the tank A and the tank B each posses 5.5 atm of compressed air retained after the first transfer process. If this potential energy is used in successive Natural Pressure operation, using the maximum energy retained at the end of each operation, the total transfer height that this operation can achieve is as follows.

The total volume of the tank A, tank B and the third tank is 3 $m^3$, and since the product of the total volume and the pressure is fixed, the following calculation is obtained:

$$P_4\times 3=11,\ P_4=3.66,$$

$$10\ \mathrm{m}\times(3.66-1)\text{- }26.6\ \mathrm{m}$$

Theoretically, as long as Px exceeds 1, Natural Pressure operation is possible. When a series $$\sum_{K=1}^{10} 10\left(\frac{11}{K+1}-1\right)$$

is calculated by a computer, the obtained result is 122.19 m. Namely, the maximum active power of the compressed air which was retained after 1 $m^3$ of water on the ground is pushed up to the level of 100 m has an actual power to be able to push 1 $m^3$ water up to further 122 m in additional to the 100 m as shown in FIG. 2. This is not a problem of kinetics, however, but should be calculated according to thermodynamics. The 122 m figures as well is also determined merely using the tank capacity of 1 $m^3$. When precisely calculated using integral calculus, and in terms of thermodynamics, it is proven that the energy available is equal to that which can push water up to the height of 164 m.

Thus, it becomes clear how powerful the maximum energy of the active power retained in Atmospheric Pressure operation is. At the same time, it becomes clear that it is impossible to utilize the retained full active power in the above method wherein 1 $m^3$ tanks are used, and that some other alternative means should be devised. As this alternative, the Added Pressure operation, to be explained below, has been provided in accordance with the present invention.

Embodiment 3—Added Pressure Operation

Negative Pressure Operation

Added Pressure operation and Negative Pressure operation are explained herein below. Added Pressure operation is a method wherein compressed air, rather than the air in the atmosphere, is taken and compressed by a compressor for the use of a transfer operation. Therefore, the operation in which compressed air, retained as an energy source after an Atmospheric Pressure operation, is taken and compressed for another transfer, and the operation which utilizes compressed air retained in a receiver tank prior to the operation with the use of excess electricity, can both be called Added Pressure operation. Conversely, the operation wherein a compressor is used, under a negative pressure, i.e., under such a condition that the air inside a tank is below atmospheric pressure, so that the thin air is taken in the compressor for transfer of water, is called Negative Pressure operation. The operation wherein high pressure air inside a tank is taken and compressed for transfer of water is called Added Pressure operation; however, as the compressor continues to take the air, the pressure inside the tank decreases, and when the pressure drops to the level of the atmosphere, the operation becomes the Atmospheric Pressure operation, and thereafter the operation becomes the Negative Pressure operation. In Negative Pressure operation, when the air is taken by the compressor until the inside of the tank becomes a vacuum, the water can be drawn up to the height of 10 m under the standard atmosphere. But the efficiency is decreased when compressor is used in negative pressure. However, the following operation facilitates the transfer. Namely, for example, in Atmospheric Pressure operation in FIG. 1, the tank B is closed to the atmosphere and the valve b is connected to the valve x of the compressor D when Atmospheric Pressure operation is conducted for the water in the tank A through the valve y of the compressor D, so that the air in the tank B is drawn through the valve x of the compressor D in order to keep the air pressure in the tank B slightly negative, while the air pressure in the tank B increases with the inflow of water. In this operation, two cylinders are required for the compressor.

Figure 3:
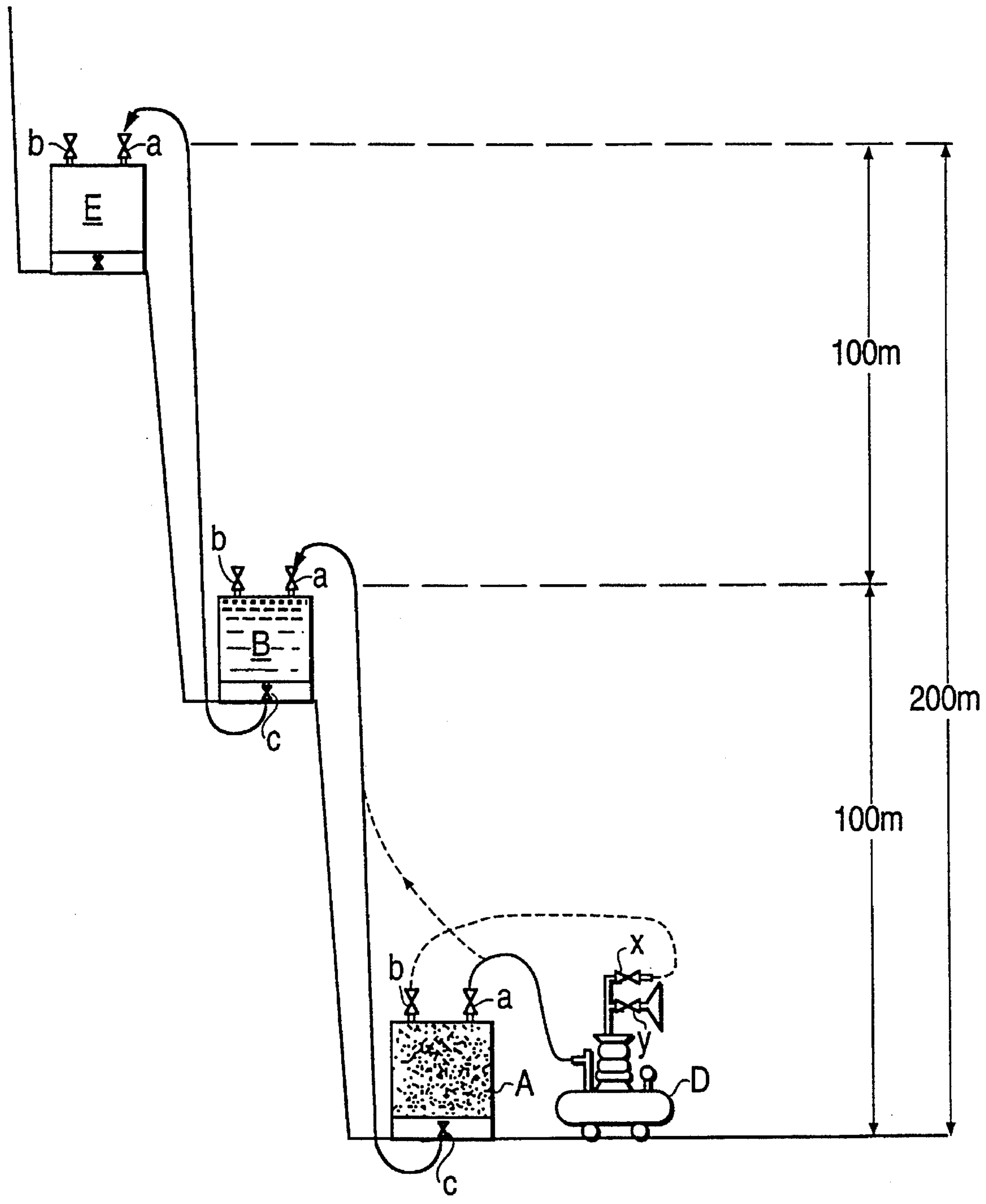
FIG. 3 illustrates yet another basic embodiment of the transfer method in accordance with the present invention showing Added Pressure operation.

In FIG. 3, the water in the first tank A has been pushed up into the second tank B 100 m above, and the tank A is filled with the compressed air of 10 atm gauge pressure retained after the operation. The third tank E is set 100 m above tank B. When the tank B and the tank E are connected with a pipe as shown, the water either rises close to the top of the 100 m pipe, or clears the top and flows into the tank E in small quantities. Whether the water flows into the tank E or not depends on slight differences in such factors as the diameter of the connecting pipe and the location of the control valves. Also, at the same time, although the 10 atm pressure in the tank A drops slightly, it is acceptable to regard it as 10 atm. Now, when the valve b of the tank A and the valve x of the compressor D are connected and opened so as to send the almost 10 atm compressed air inside the tank A though the compressor to the valve a of the tank B, all the water in the tank B is pushed up into the tank E. As mentioned before, in Natural Pressure operation, 1 $m^3$ of water was pushed up into a tank 45 m above the tank B without using the compressor and without any force applied from outside, and 2 $m^3$ of the compressed air with 5 atm was retained as potential energy, and if the potential energy is repeatedly used in continuous Natural Pressure transfer operation, it is capable of pushing up the water 122 m with the air of 1 $m^3$ tanks, and theoretically 164 m when calculated in terms of thermodynamics. Then in Added Pressure operation, considering that the compressed air of 10 atm gauge pressure having such powerful energy is further acted on the objects to be transferred by the compressor, it is naturally predicted that the necessary consumption of electricity and time can be greatly reduced as compared with Atmospheric Pressure operation. Laboratory results showed that Added Pressure operation achieved a transfer of all water in the tank B into the tank E with two fifths of the electricity and one fifth of the time required for Atmospheric Pressure operation. The efficiency of the operation is more than 70% which far exceeds the standard efficiency of pumps, that is, 50%. It should be noted, however, that in this laboratory test, the inner diameter of the pipe used was 1 inch, and the capacity of the booster compressor used was 2 h.p.(1.5 Kw). In another test where the compressed air of 3 atm gauge pressure and a pipe with a two-inch inner diameter were used, the transfer time was 25% less than that with the one-inch pipe. Similarly, if the two h.p. compressor, capable of output of 107 liter/minute, is replaced by a more powerful unit, i.e., 5 h.p. or more, the output becomes larger, which leads to further savings in both time and energy. In this Added Pressure operation, the efficiency is 100% in a thermodynamic calculation with the assumption of isothermal compression, and it is impossible to achieve any higher efficiency.

In practice, however, perfect isothermal compression cannot be obtained, and besides, there should be estimated some loss caused by slight air leaks (blow-by) and friction between the cylinder and piston, and therefore 100% efficiency is not experienced. But it is not difficult to come close to isothermal compression, and the losses caused by the blow-by have been reduced with improvements in the equipment, so that 100% efficiency is not absolutely impossible. As so far explained, Added Pressure operation is highly efficient. Following the initial Atmospheric Pressure operation, all energy retained after the operation can be repeatedly used in Added Pressure operation, theoretically with 100% efficiency of transfer. It is possible to effect various efficient improvements, such as using a pipe with a larger inner diameter, increasing the number of pipes, or using a compressor with a larger capacity, in relation to the nature of the liquid to be transferred. It is of course possible to obtain higher efficiency without conducting the less efficient Atmospheric Pressure operation, if Added pressure operation is conducted with the required amount of compressed air which is accumulated as an energy source in a pressure tank or receiver tank in advance using excess electricity.

Added Pressure operation is efficient as explained above. When the process is analyzed, however, it is divided into a first phase, Added Pressure operation, and a second phase, Atmospheric Pressure operation. If the latter Atmospheric Pressure operation is replaced by Added Pressure operation through the use of pre-stored compressed air, the efficiency always exceeds 100% for the energy supplied with the compressor in operation, provided that the stored compressed air is obtainable for an inexpensive price and therefore its cost is negligible.

Suppose the valve b of the tank E is open to the atmosphere. If all the air of 10 atm gauge pressure in the tank A is transferred to the tank B, the tank A becomes a vacuum, and in the tank B the compressed air replaces the water which gets pushed up to the tank E. As mentioned previously, it is very inefficient to have a vacuum. Therefore, in the process of transferring, the compressed air in the tank A drops down to atmospheric level, such an automatic control is made as closing the valve x and opening the valve y of the compressor D for taking the atmosphere to continue Atmospheric Pressure operation for the tank B. Laboratory test results show that during the Added Pressure process, namely, during the interval from the atmospheric pressure plus 10 atm gauge pressure to the atmospheric level, 93% of the water in the tank B has been pushed up into the tank E. Accordingly, Atmospheric Pressure operation is applied to the remaining 7% of the water. It is also possible to use Added Pressure operation for the remaining 7% as mentioned before, because Atmospheric Pressure operation is less effective. The efficiency increases considerably if the required amount of compressed air is prepared in advance in a receiver tank, so that it can be used as an energy source for the transfer of the remaining 7% of the water, instead of switching the compressor to Atmospheric Pressure operation, and the whole process is made in Added Pressure operation.

In either case, all the water in the tank B can be transferred to the tank E with much higher efficiency than in Atmospheric Pressure operation, and at the same time, the tank B retains compressed air of atmospheric pressure plus 10 atm as an energy source for the next transfer operation. The efficiency can be further increased with more sophisticated controls. It has already been mentioned that the efficiency in Added Pressure operation becomes 100% when it is calculated in terms of thermodynamics.

As in the Atmospheric Pressure operation and Natural Pressure Operation explained previously, the maximum level of active power, i.e., a pressure of 10 atm plus the atmospheric pressure in this model, is retained in the tank B. Therefore, once the initial Atmospheric Pressure operation is executed, henceforth the whole process can be incorporated into the complete cycle of the Added Pressure operation, and succeeding operations are automatically performed in Added Pressure operation. Accordingly, 100% efficiency can be maintained regardless of how many time the operations are repeated. In practice, however, with incomplete isothermal change and a small amount of blow-by, the efficiency will be slightly less than 100%.

In this embodiment of Added Pressure operation, since the tank E is open to the atmosphere with the valve b open, the operation is switched to Atmospheric Pressure operation when the pressure in the tank A drops to the atmospheric level, and the remaining 7% of water is transferred in Atmospheric Pressure operation. The energy required to send up the 7% of water up to 100 m height is theoretically equal to that required to compress 1 $m^3$ of air at atmospheric pressure to 10 atm. It has already been mentioned that the efficiency of Atmospheric Pressure operation is lower. In more detail, in terms of amount of work, Added Pressure transfer of the remaining 7% water takes 24, which means that Atmospheric Pressure operation is less than a quarter as efficient as Added Pressure operation.

If the whole process is performed in Added Pressure operation, the efficiency exceeds 100% both theoretically and in practice. This can be easily realized by storing high pressure air in a large receiver tank utilizing the excess electricity generated during the night.

Embodiment 4—Alternate Added Pressure Operation

Figure 4:
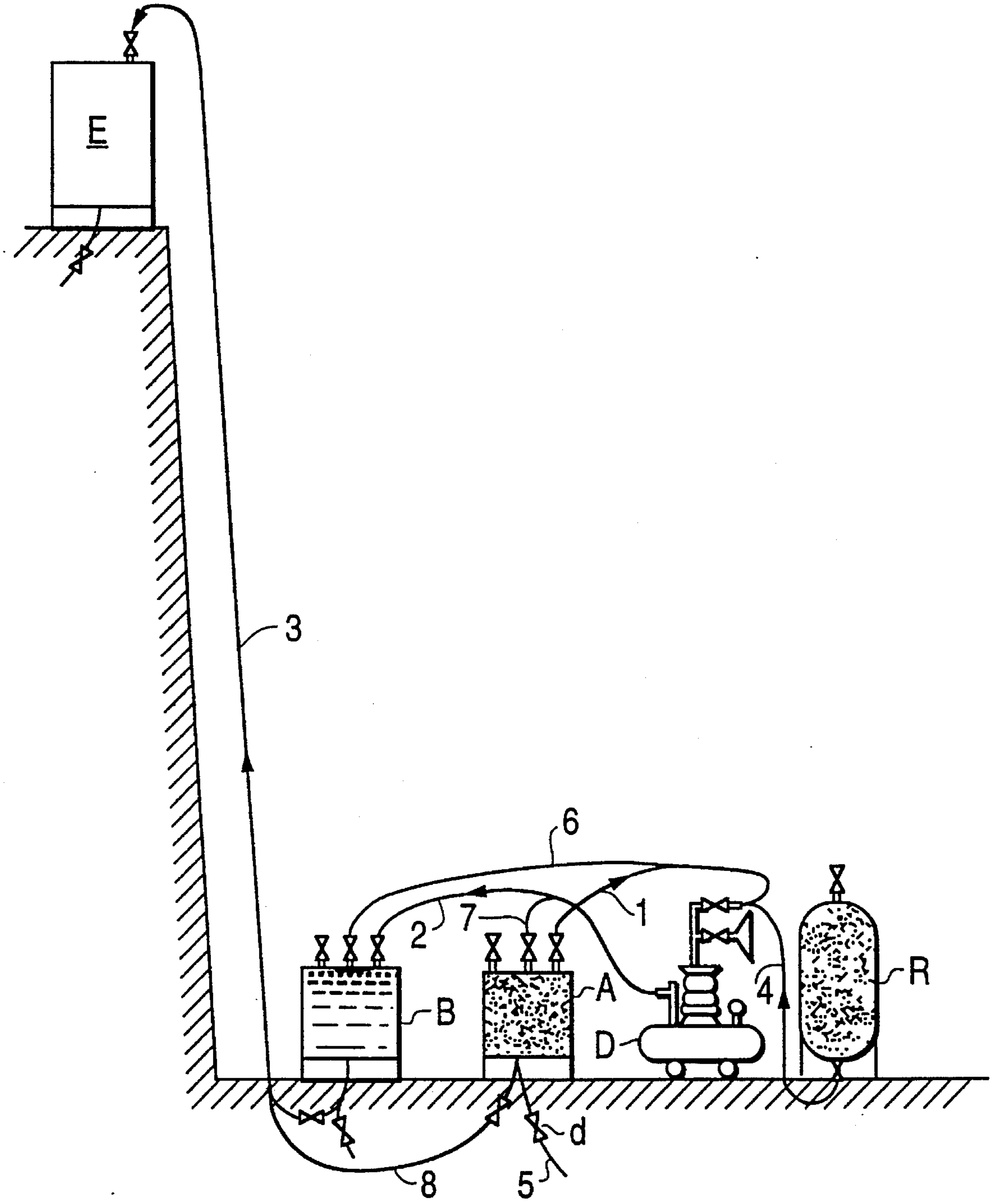
FIG. 4 illustrates an embodiment of the transfer method in accordance with the present invention showing Alternate Added Pressure operation as a practical form of Added Pressure operation, FIGS. 5(A) and (B) illustrates the operation of a fluid element used in a pure fluid type pump for comparison purposes.

FIG. 4 illustrates one embodiment of a practical Added Pressure operation for transferring liquid constantly to the levels of a certain height. This operation is characterized by that the liquid can be transferred to a specific height continuously in added Pressure operation by using two pressure tanks and alternately retaining therein compressed air as an energy source. This operation is useful in a wide range of applications, including sending up concentrated liquid organic fertilizers to multiple points on a mountain slope and, as explained later, for flowing back water to the upper reservoir at hydroelectric power plants using the excess electricity generated during the night.

As a preparatory step, the tank A is filled with 10 atm compressed air and the tank B is filled with water. At a level 100 m above the ground is the tank E, which is open to the atmosphere. To the right of the compressor D is a receiver tank R filled with high pressure compressed air. First, the compressed air in the tank A is sent into the tank B through pipe 1, compressor D, and pipe 2. Then, the water in the tank B rises 100 m through the pipe 2 and flows into the tank E. When the gauge pressure of the tank A drops to zero, or to the atmospheric level, the high pressure compressed air in the receiver tank R is transferred into the tank B through pipe 4, compressor D, and pipe 2, in order to push up all the remaining water into the tank E in Added Pressure operation. During the above process, when the pressure in the tank A drops to the atmospheric level, water starts to be poured into the tank A through pipe 5 so that the tank is filled with water at the time all the water in the tank B has been transferred into the tank E. The compressed air which is retained in the tank B and exceeds 10 atm is sent into the tank A through pipe 6, compressor D, and pipe 7 in order to send the water into the tank E through the pipe 8. Thus by alternately transferring the objects in the tanks A and B in Added Pressure operation, a continuous transfer into the tank E can be made.

It is also possible to control the operation as follows. Namely, at the instant when the pressure in the tank A drops to the atmospheric level, the valve d at the bottom of the tank A is opened to send water through the pipe 5 into the tank A by the slightly negative pressure caused by the continuous operation of the compressor D, and thereafter the valve d is closed, detecting the instant when the tank A is filled with water. At that time, the compressor works as the compressed air of the receiver tank R is sent into the tank B.

As mentioned above, Alternate Added Pressure operation makes it possible to transfer the objects continuously by sending the compressed air alternately into the tanks A and B. The compressed air flows in a closed system comprising two tanks A and B, compressor, and receiver tank, and does not flow out of the system. Further, if the liquid sent up to the tank E is returned to the tanks A and B, both the air and liquid can be circulated in a closed system. Also, by enclosing the compressor and receiver tank in an airtight box so that air leaking from the compressor can be put back into the receiver, the system can be made a complete closed system with a powerful pumping function, and then the following applications are feasible.

Recently, use at locations such as nuclear reactors and chemical plants where radioactive or otherwise hazardous liquids are handled, highly reliable pure fluid type pumps have become topical, which involve no moving mechanism directly contacting the liquids.

An explanation is given below regarding cases where a fluid element called a Reverse Flow Diverter (RFD) is used.

Figure 5A:
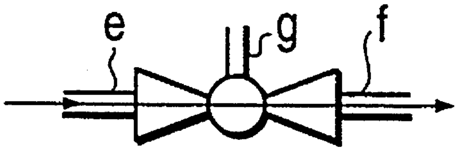
Figure 5B:
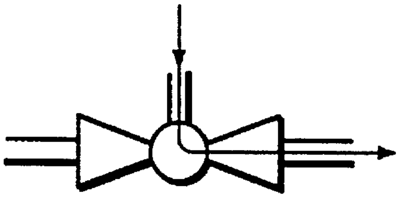

The element, as illustrated in FIG. 5, is a mechanism with three arms, e, f, and g, with e being high in pressure and f being low in pressure at all times. When g is low in pressure, liquid flows from e to f [see FIG. 5(A)], and when g is high in pressure, it flows from g to f [see FIG. 5(B)].

Figure 6:
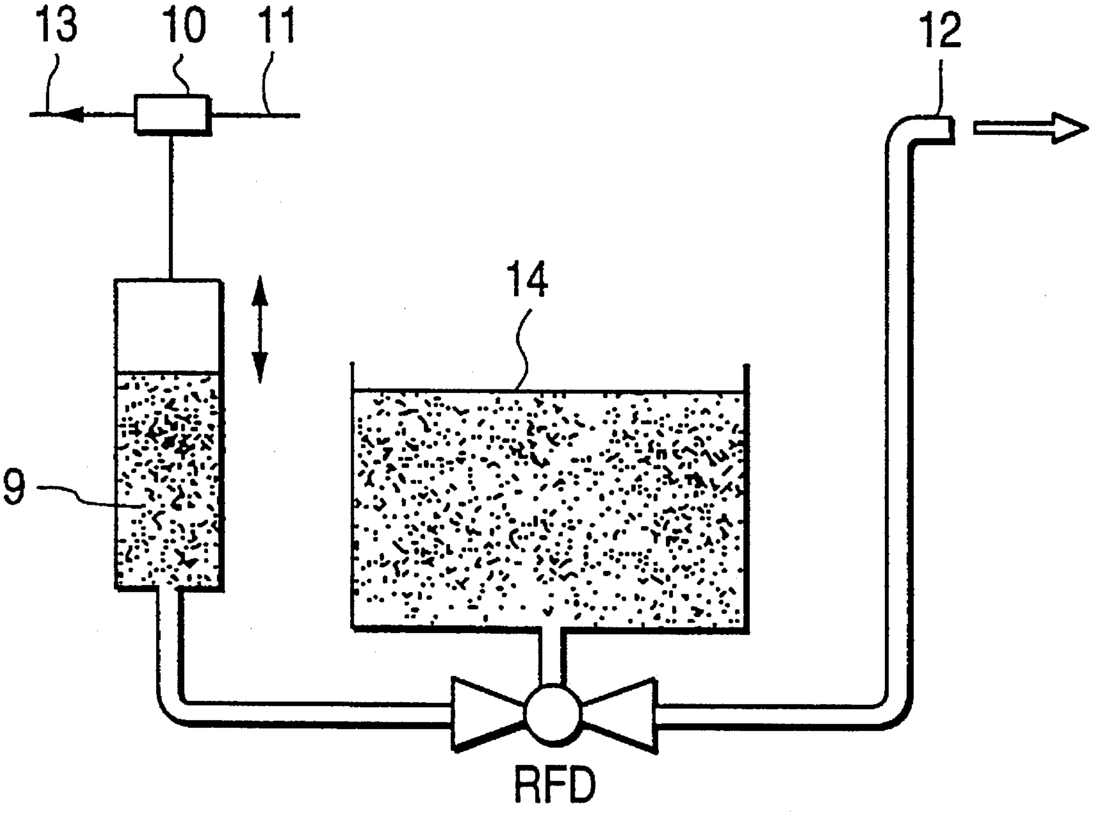
FIG. 6 illustrates one example of a pure fluid type pump.

A device shown in FIG. 6 is proposed as one model of a pure fluid pump with an RFD. In FIG. 6, after a tank 9 is filled with water, the tank is connected with high pressure air

11 through an electromagnetic valve 10. Then, the high pressure air flows into the tank 9 and the water inside the tank flows towards a discharge outlet 12. When the tank 9 is filled with the air, the electromagnetic valve is used to cut the connection between the tank 9 and high pressure air 11, and to connect the tank with negative pressure air 13. When the air in the tank 9 has been discharged and the pressure is negative, the water in a feed tank 14 flows into the tank 9 until it is full. High pressure water is then regularly sent to the discharge outlet 12 by repeating this process. However, this model is extremely inefficient because the energy required to create the high pressure air is enormous.

Figure 7A:
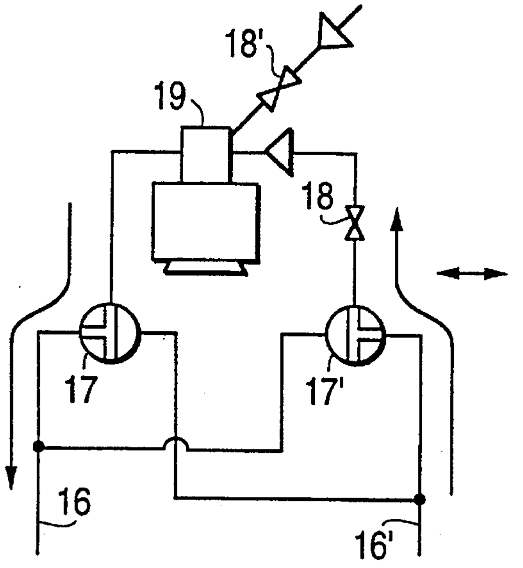
FIGS. 7(A)–(C) illustrate a transfer method of high pressure water in accordance with the Alternate Added pressure operation of the present invention.

In order to minimize the energy for creation of high pressure air, the aforementioned Added Pressure operation can be applied. The proposed device is illustrated in FIG. 7. This model has two tanks and two RFD elements with a feed tank 14 at a higher level. 15 and 15' are pure fluid elements like snail elements which function as anti-reflux valves. The upper drawings in the figures show the switching modes of the system (7A–7B).

[Preparatory Stage]

Tanks 9 and 9' are filled with water. Cocks 17 and 17' connecting pipes 16 and 16' are in FIG. 7A mode. Valve 18 is closed and valve 18' is opened to draw in outside air to be compressed in a compressor 19 to the required compression level, and the compressed air is sent to the tank 9 through the cock 17 and the pipe 16. The water in the tank 9 is then pressurized and is sent to a discharge outlet 12 through RFD R, leaving the tank 9 filled with compressed air. Although the pipe 16' is connected to the cock 17' and the valve 18, the tank 9' remains filled with water because the valve 18 is closed.

[First Stage]

Figure 7B:
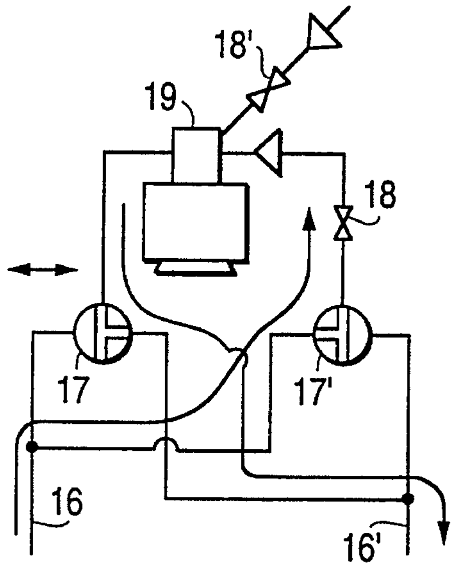
Figure 7C:
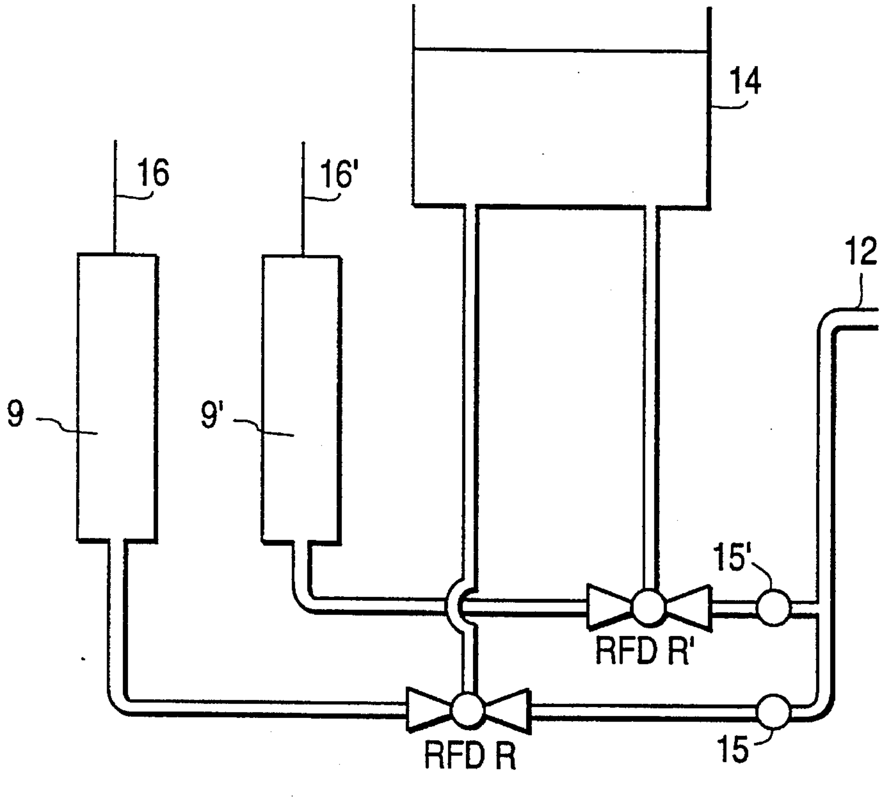

The valve 18' is closed and the valve 18 is opened and the system is put in FIG. 7B mode by changing the cocks 17, 17'. When the compressor 19 is put to work, the compressed air in the tank 9 is taken into compressor 19 through a pipe 16, cock 17' and valve 18 to be pressurized to the required compression level and then is delivered out of the compressor. The compressed air is sent to the tank 9', which is full of water, through the cock 17 and the pipe 16'. The water pressurized in the tank 9' is sent out to the discharge outlet through RFD R'. The air pressure in the tank 9 gradually decreased until finally it is filled with water from the feed tank 14 through RFD R. At the end of the first stage, the tank 9 is full of water and the tank 9' is full of compressed air.

[Second Stage]

At the time the first stage is finished, three-way cocks 17 and 17' are switched over so that the system above the pipes 16, 16' are set in FIG. 7A mode. The compressed air in the tank 9' is drawn into the compressor 19 through the pipe 16' and the cock 17' to be compressed to the required compression level and then delivered out to the tank 9 through the cock 17 and the pipe 16. The water in the tank 9 is pressurized and sent out to the discharge outlet through RFD R. The tank 9 is then filled with the compressed air, and the water in the feed tank 14 flows into the tank 9', which now is lower in pressure At the end of the second stage, the tank 9 is full of compressed air and the tank 9' is full of water, the same condition as at the end of the preparatory stage. By repeating the procedures of the first and second stage, the water in the feed tank can be continuously pressurized and sent out to the discharge outlet.

As illustrated in the above, in transferring water with high pressure at nuclear reactors and chemical plants, eliminating direct contact with mechanical moving parts, Alternate Added Pressure operation can be used as a method to achieve efficiency as high as 100%, assuming isothermal compression is available.

In chemical plants and nuclear reactors, repair work of machine failure is extremely difficult. Human lives could be at stake in such work. Devices to be used for reactors should be those with a small probability of failure. It is also preferable that moving parts or mechanisms which have a high possibility of failure do not come into direct contact with radioactive water and are as far removed from the water as possible. It is believed that design improvements to achieve these ends are urgently needed.

Embodiment 5—Continuous Added Pressure Operation

The above Alternate Added Pressure operation can efficiently transfer liquid to a point or points of a certain height, for example, 80 m above the ground with the compressed air of 10 atm or so. But, several vertical operations with a 70 m to 100 m distance are necessary in order to transfer the objects to levels as high at 700 m.

Figure 8:
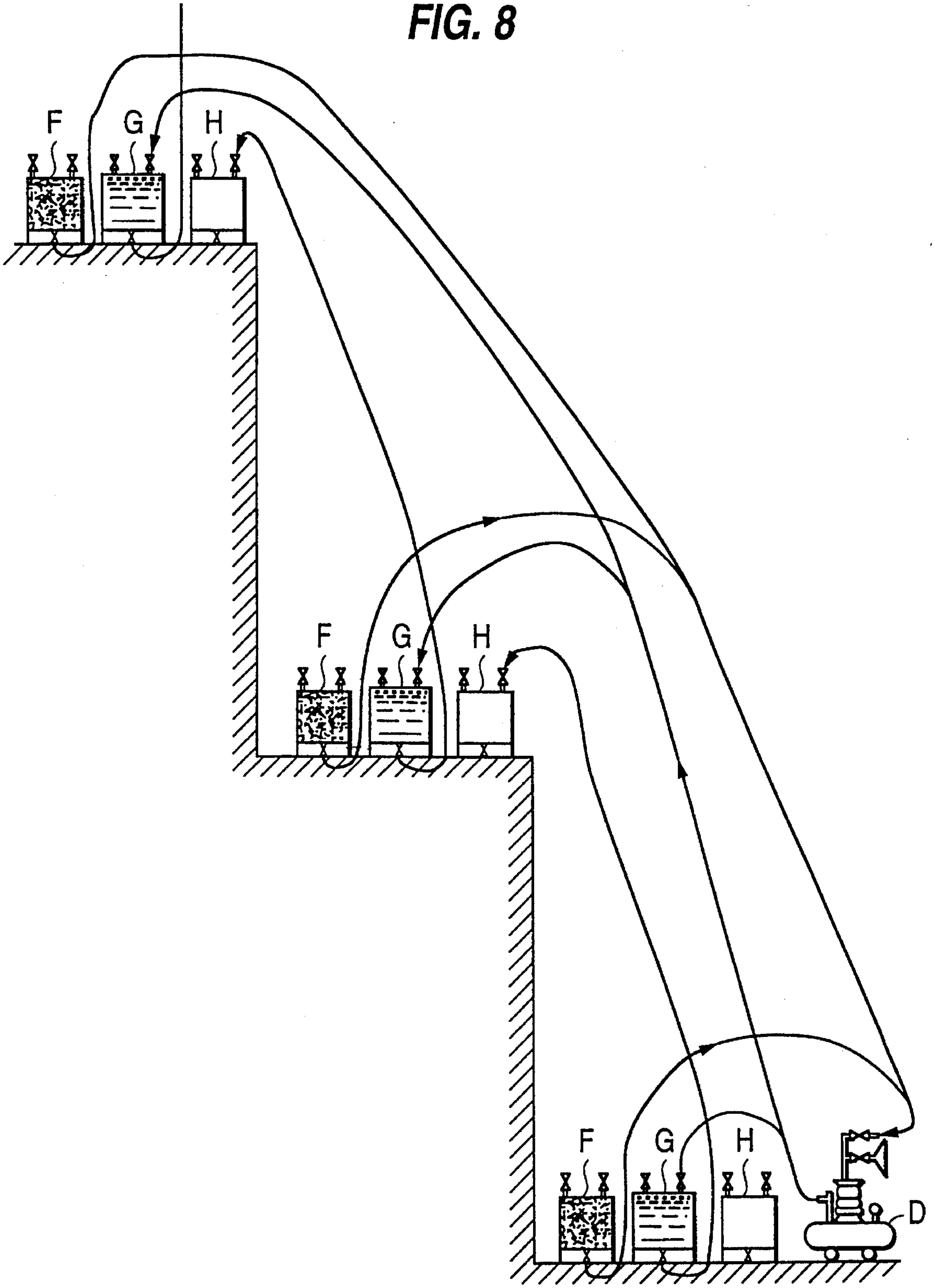
FIG. 8 illustrates a Continuous Added Pressure operation an another practical form of the Added Pressure operation.

Illustrated in FIG. 8 is Continuous Added Pressure operation which has been developed in order to permit fairly efficient transfer to such a high level with a single compressor.

FIG. 8 shows a model which performs the transfer in a relay fashion over a 70 m to 100 m span. Only the first three levels are shown here, with the rest omitted. On each level are three pressure tanks, F, G, and H, from the left, where the tank F is filled with compressed air at 7 to 10 atm gauge pressure. The tank G is filled with water. The tank H is open to the atmosphere. On each level, the compressed air in the tank F is delivered into the tank G so that the water is sent up to the tank H on the next level. During that process, the tank H on the first level is filled with water. Then, the compressed air in the tank G is sent into the tank H on each level so that the water is transferred into the tank F on the next level. During that process, the tank F on the first level is filled with water. By repeating the above processes, the water can be continuously transferred in Added Pressure operation to high levels. Practically speaking, it is more efficient in this mode, as well, to provide high pressure compressed air in a receiver tank in order to perform the whole process in Added Pressure operation.

Embodiment 6—Dredging or Gathering of Minerals at Sea or Lake Bottoms

All the models explained so far are under normal atmospheric pressure regardless of whether they were on the ground or in a pit several hundred meters below the ground. In this section, transfer operation under water is explained. Under water, the method can produce extremely high efficiency inconceivable in the atmosphere. The principle of the operation is presented first.

Figure 9:
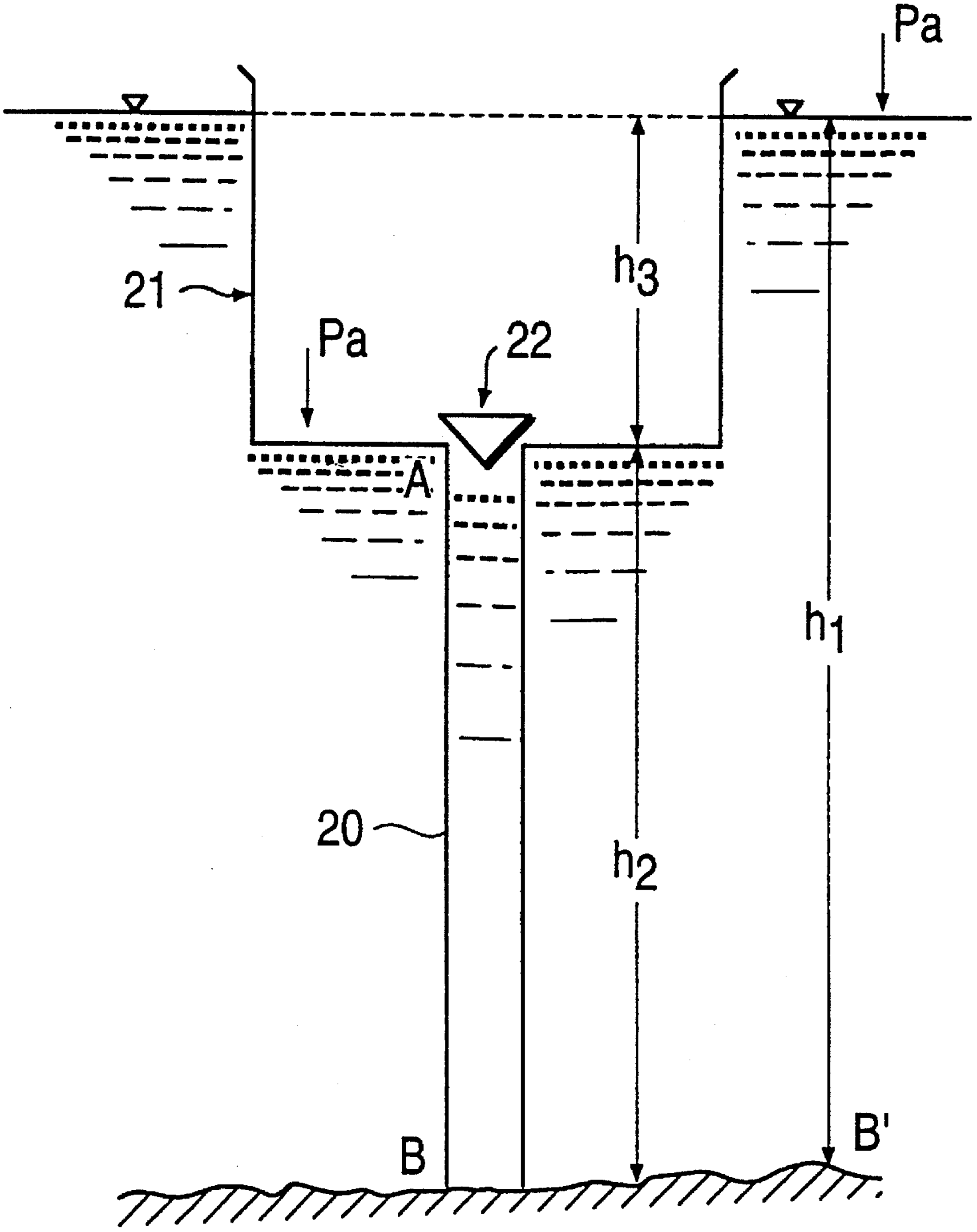
FIG. 9 illustrates the principle of operation of the present transfer method when applied to the dredging of water bottoms or gathering of minerals.

FIG. 9 shows the principle. A tank 21 with a pipe 20 attached to its bottom is set under water. The upper portion of the tank is slightly above water, and the lower edge of the pipe is very close to the water bottom. Now, take a look at what happens when a valve 22 is opened after the water in the tank has been discharged out with the valve closed.

The water in the pipe received the atmospheric pressure Pa at upper end A of the pipe and receives the water pressure PB at the lower end B. PD is uniform on a level with B and is equal to the water pressure PB' at the depth of h1. With the density of water being ρ, and gravitational acceleration g, the following equation is obtained:

$$PB=PB'=\rho gh+Pa \quad (1)$$

The water in the pipe is pulled downward by gravity, the magnitude of which is $G=\rho gh_2S$, assuming the pipe's cross sectional arc to be S. When water starts going up the pipe, frictional resistance L proportionate to the square of its velocity pulls the water downward. If the acceleration of the water with mass m ($m+\rho sh_2$) inside the pipe is α, the following equations are obtained according to Newton's Second Law;

$$m\alpha=F=PB-G-L \quad (2)$$

$$(\rho Sh_2)\alpha=(\rho gh_1+Pa)S-PaS-\rho gh_2S-L \quad (3)$$

$$(\rho Sh_2)\alpha=(\rho gh_1+\rho gh_2)S-L$$

$$(\rho Sh_2)\alpha=\rho gh_3S-L$$

$$\rho h_2\alpha=\rho gh_3-L/S \quad (4)$$

If the average density of the water inside the pipe is ρ', different from that of pure water by the reason of sand and sludge included, $G=\rho'gh_2S$ can be substituted. From the equation (4), it is noted that the force given to the water inside the pipe is determined by the depth h of the tank, and that the larger $h_3$ is, the larger the force is. If α=0 with the water steadily ascending, $\rho gh_3=L/S$ -----(5). Since L is proportional to the square of the velocity v of the water inside the pipe and the length of the pipe $h_2$, it is deduced that the larger $h_3$ is, the larger v is.

Now, let us think of a case where sand, pebbles and minerals are stirred with water close to the water bottom and are sent up to the tank in the above method. Being heavier than water, these objects are liable to sink even though they were once suspended in the water, so that the stirred water must be sent into the pipe before they sink down to the bottom again. Also, the deeper the water is, naturally $h_2$ is larger and therefore the larger L becomes. In order to overcome these factors and achieve a successful transfer, it is necessary that the tank depth $h_3$ be considerable. This transfer operation is called here Natural Pressure operation under water. Though it is a self-evident truth, the efficiency of Natural Pressure operation under water is extremely high. From this fact, it is proposed that sand and minerals be pushed up to a shallower water level using the extremely useful Natural Pressure operation under water and be further transferred to a remote place by using highly efficient methods such as Alternate Added Pressure operation, etc., which are selected depending on the state of the place where the operation is performed. Thus, we can avoid the conventional simple ineffective methods which transfer sand and pebbles by pumps and other equipment from the water bottom to remote land.

Figure 10:
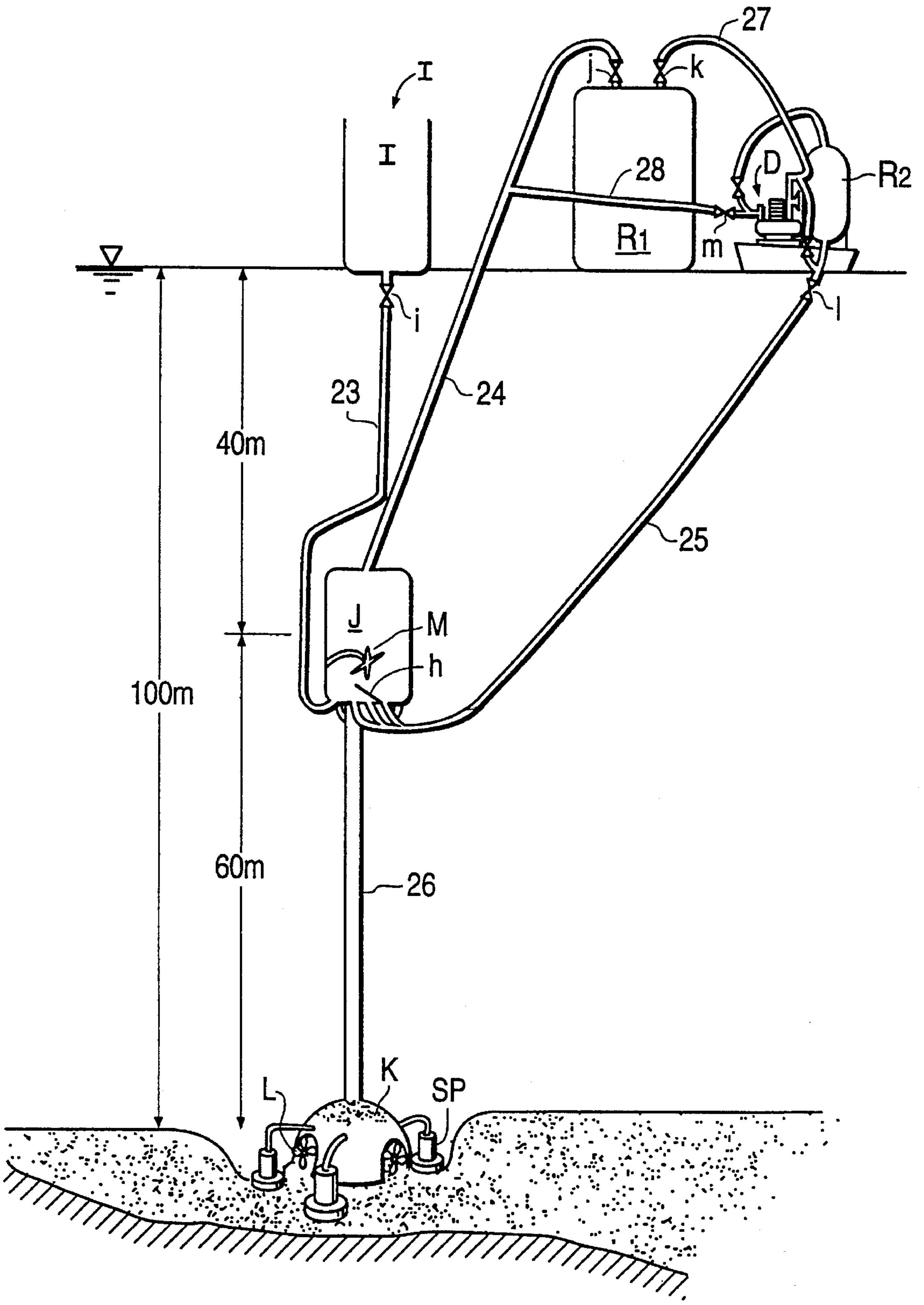
FIG. 10 illustrates an embodiment of a water bottom dredging in accordance with the present invention.

Here, an example of lake bottom dredging at a depth of 100 m is explained along with FIG. 10. In this operation, a tank I with a capacity of 100 m on the water and a tank J with the same capacity at the depth of 40 m are connected by a pipe 23, and the tank J is then connected to the steel dome K placed on sand and pebbles at the lake bottom 60 m below the tank J. The dome K is provided with sand pumps SP around it and impellers L to rake in sand and pebbles so that the mixture of sand and pebbles and water can be sent into the dome under electronic control. It is something like the cutter part of a sand pump boat, only on a larger scale. When it is necessary to prevent the lake water from getting muddy during the process of dredging, a larger dome with valves on its surface which open towards inside of the dome is used. The impellers are installed in the dome and the sand pumps are removed. The valves are closed when the impellers work in the dome, and they are opened when the system is in Natural Pressure operation to allow water to come into the dome to make a mixture of the sand and water.

The Tank J has a valve h at its bottom which operates in an up and down manner. It prevents sand and pebbles from dropping out once they are in the tank. Provided on the water is a receiver tank $R_1$ with a capacity of 200 m which is connected to the tank J via a pipe 24. Provided on the boat are a booster compressor D and a high pressure receiver tank $R_2$. A pipe 24 from the receiver tank $R_2$ is multi-endedly connected with the tank J for stirring the sand mixture in tank J. The pipe 26 connecting the tank J and the dome K accommodates any change in the level of the lake bottom so that the whole system can stay in its current location.

The tank I on the water and the receiver tank $R_1$ are empty and under atmospheric pressure. The receiver tank $R_2$ is filled with approximately 10 atm compressed air at all times. 10 atm pressure is not always necessary; however it is desirable to use high pressure compressed air for blowing up sand accumulation, which can be obtained and stored using inexpensive electricity during the night. Needless to say, since the tank J and the dome K are under water, the tank J is under 4 atm and the dome K under 10 atm water pressure. In this model, the receiver tank $R_1$ has a capacity of 200 m, which is double that of the tank J in order to avoid sending up air having the volume of the tank J in Atmospheric Pressure operation in the last stage of Added Pressure operation. For this reason, the water pressure at the depth of 40 m is not fully utilized. But it should be noted that this model is selected for easy understanding.

[First Stage]

When compressed air higher than 4 atm is put into the tank J in Added Pressure operation from the receiver tank $R_2$ or in Atmospheric Pressure operation from the compressor D, the valve h closes down and all the water in the tank J is transferred up to the tank I. The efficiency here is the same as in Added Pressure or Atmospheric Pressure operation under the atmospheric pressure on the ground. The 100 tons water transferred into the tank I is all discharged to the lake, and the valve i at the tank bottom is closed. The tank I is empty. Each component of the system is in the following condition.

Tank I: Empty under atmospheric pressure

Tank J: Filled with compressed air over 4 atm gauge pressure

Dome K: Not in operation and under 10 atm water pressure

Receiver tank R: Empty under atmospheric pressure

Receiver tank $R_2$: Filled with 10 atm compressed air

[Second Stage]

Sand pumps SP and impellers L are in operation to send sand and pebbles into the dome. At the same time, the valve j is opened and the valve k is closed on the receiver tank $R_1$. The compressed air over 4 atm in the tank J flows into the receiver tank $R_1$, which has double the capacity compared with the tank J and is under atmospheric pressure, so that the pressure inside the tank J drops rapidly. Then the mixture of water and sand made in the dome K rushes into the tank J through the pipe 26. The valve j is so regulated that the mixture flows into tank J with a proper mixture ratio. The transfer made herein is Natural Pressure operation using water pressure, buoyancy, and pressure differences. The 200 m receiver tank $R_l$ which has been under the atmospheric pressure at the first stage receives the compressed air of 4 atm gauge pressure from the 100 m tank J and gradually goes up in pressure. A sensor detects the moment when the tank J is filled with the sand mixture from the dome K and closes the valve j. At this point, the pressure in the receiver tank $R_1$ is 2.5 atm gauge pressure, which prevents the sand mixture from flowing up further than a depth of 25 m regardless of the position of the valve j. In this second stage, Natural Pressure operation can transfer sand and pebbles even with the relatively heavy specific gravities from considerably deep water bottoms by using a properly sized receiver tank $R_1$. In this respect, the transfer in water can be extremely advantageous when compared to Natural Pressure operation taking place in the atmosphere. The condition of each component at this stage is as follows:

Tank I: Empty under atmospheric pressure

Tank J: Filled with sand mixture from the dome

Dome K: Operation stopped after sensing transfer of 100 m sand mixture to the tank J Receiver tank $R_1$: Filled with compressed air around 2.5 atm gauge pressure Receiver tank $R_2$: Filled with around 10 atm compressed air

[Third Stage]

The sand mixture in the tank J is starting to sink and accumulate at the bottom. A valve of the receiver tank $R_2$ is opened to send high pressure compressed air from the tank bottom for stirring the mixture. At the same time, the valve j of the receiver tank R is closed and a valve k and a valve m of the compressor D are opened to transfer the sand mixture up to the tank I in Added pressure operation using the compressed air in the receiver tank $R_1$ through pipe 27, compressor D, pipe 28, and pipe 24. Since the 10 atm compressed air sent into the tank J from the receiver tank $R_2$ rushes up trough the sand accumulation at the bottom of the tank, it can make even an extremely thick accumulation flow up. If necessary, a Stirrer M is operated to stir the mixture. The energy required for the stirring is minimal, because it is not necessary to provide any potential energy. Part of the compressed air remains in the sand mixture as bubbles, and plays the role of air bubbles in an air bubble pump, which enhances the effectiveness of Added Pressure operation. The remaining compressed air goes up through the sand mixture and is combined into the compressed air for Added Pressure operation from the receiver tank $R_1$, which works to reinforce the effectiveness of Added Pressure operation. In sum, the compressed air plays four roles, such as supplemental energy at Added Pressure operation, reinforcement of Added Pressure operation, acting as an air bubble pump, and promoting stirring.

Detecting the instant when all of the sand mixture in the tank J has been transferred up to the tank I, the valve l is closed to stop stirring and the compressor is stopped. This is the end of the third stage. Here, unlike in the first stage, 100 tons of liquid in the tank I is not lake water, but the sand mixture drawn up from the bottom of the lake. Now, it is desirable to use Alternate Added Pressure operation or Continuous Added Pressure operation, both applied Added Pressure operations mentioned earlier, in order to transport the mixture to a remote place. At the end of the third stage, the tank J is filled with compressed air of over 4 atm pressure, and the pressure in the receiver tank $R_1$ drops close to the atmospheric pressure. Thereafter, going back to the second stage, another Natural Pressure operation using water pressure can be conducted to transfer the sand mixture at the lake bottom 100 m below up to the tank J. By repeating the above process, dredging of water bottoms several hundred meters deep, not to mention 100 m deep, can be easily performed. In this model, the tank J is placed at the depth of 40 m, closer to the water surface, for dredging of the lake bottom 100 m deep. This is for the lake bottom water to be able to push into the tank J. Similarly, in order to make the contents of the tank J gush up to the tank I, high pressure, perhaps 6 or 7 atm, is to be applied to the tank J. In principle, it is necessary to provide compressed air of at least a little over 4 atm gauge pressure.

In normal atmospheric conditions, a transfer is possible only up to 15 m initially, in Natural Pressure operation using 4 atm gauge pressure air, when 1 $m^3$ tanks are used. In water, however, transfer of up to 60 m is possible, as set forth in this model. So long as the technical capability exists, transfer at any depth can be achieved. When the specific gravity of the sane and pebbles is not so large, i.e.,, where they sink slowly and it it thus not necessary to push them up rapidly, it is possible to place the tank J at a shallower depth, for example, at a depth of 30 m or even shallower, and the pressure to be added can be 3 atm gauge pressure or lower, which provides still higher efficiency. In this model, since the receiver tank $R_1$ is maintained at 2.5 atm gauge pressure, though the tank J is placed at the depth of 40 m, it is virtually equivalent to a depth of 15 m.

Embodiment 7—Dredging or Gathering Minerals in Sea or Lake Bottom

Figure 11:
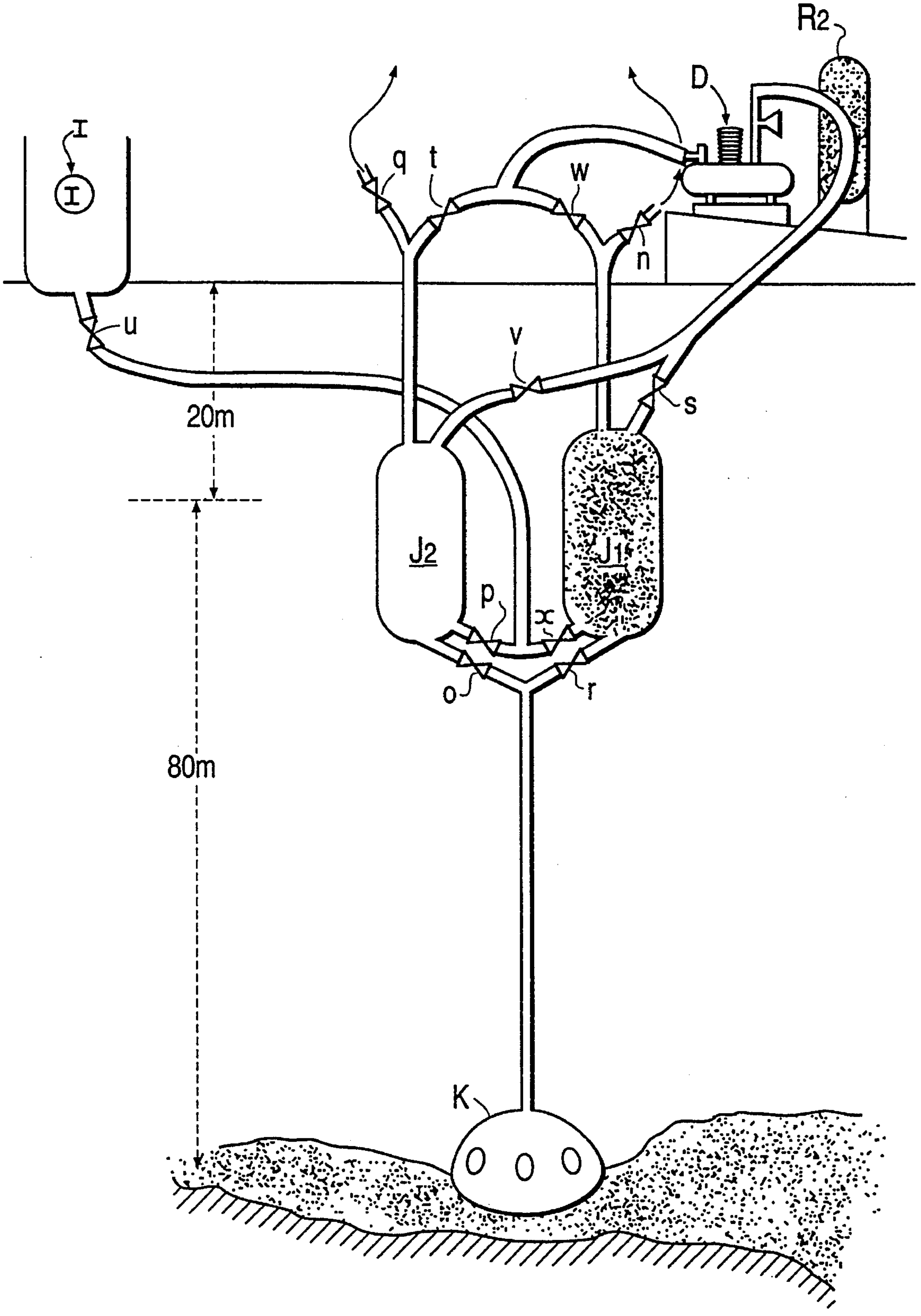
FIG. 11 illustrates another embodiment of a water bottom dredging in accordance with the present invention.

FIG. 11 illustrates a method where there are two underwater tanks side by side for a more effective transfer.

Pressure tanks $J_1$ and $J_2$ are placed side by side at a depth of 20 m. Though the contents of these tanks are to be transferred up to the tank I, the tank I does not necessarily have to be placed right above them, and it can be placed quite far away from them. The pressure to be applied to the underwater tanks is 3 atm, 2 atm of which is for the 20 m transfer, and 1 atm of which is for acceleration and agitation. Pressure input from the receiver tank $R_2$ is to be minimized here.

If the distance between the underwater tanks and the tank I is longer, the pressure to be applied can be larger than 3 atm. Continuous transfer is performed in the following process (all pressure values indicate gauge pressure).

[Preparatory Stage]

Tank J: Filled with 3 atm compressed air (Valve n is closed)

Tank $J_2$: Lower valves o and p are closed Upper valve q is open to the atmosphere, making pressure in $J_2$ equal to atmospheric pressure.

Receiver tank $R_2$: Filled with 5 atm compressed air

Dome K: Not in operation

[First Stage]

Dome K: In operation

Tank $J_2$: When the valve o is opened (valve p still closed), sand mixture gushes up to $J_2$ by virtue of Natural Pressure operation from the 10 atm underwater point with 2 atm pressure differences at the entrance of the tank since the tank is at a depth of 20 m. Detecting the instant when the tank is full, the valve o is closed, as is the valve q. (Valves q and n are both closed now and they stay closed to the atmosphere.)

[Second Stage]

Detecting the instant when the tank $J_2$ is full, the valves r and s are opened and the dome K and the compressor D start operating. As the compressor D pushed the 3 atm compressed air in the tank $J_1$ into the tank $J_2$ through the opened valve t. At the same time, the sand mixture in the dome K is pushed up by 10 atm water pressure and is sent into the tank $J_1$ through the valve r in Natural Pressure operation with a 2 atm pressure difference at the entrance. In previous Added Pressure models, the mode was switched over to Atmospheric Pressure operation or Added Pressure operation by a receiver tank when the pressure in the tank $J_1$ dropped from 3 atm down to atmospheric level. In this method, however, it is not necessary. That is, the sand mixture transferred into the tank $J_1$ pushed up the compressed air in the tank $J_1$ with 2 atm pressure, which means that Added Pressure operation is performed throughout the process with 2 atm pressure or more until the transfer is accomplished. The efficiency of this method is far higher than that of Added Pressure operation in the atmosphere, theoretically reaching 300% efficiency.

When the sand mixture in the tank $J_2$ is completely transferred up to the tank I in Added Pressure operation by the 3 atm compressed air from the tank $J_1$ (valves p and u are open and o is closed), the tank $J_1$ is filled with sand mixture. Since the tank $J_2$ is able to send up the entire sand mixture into the tank I in Added Pressure operation with pressure slightly over 2 atm, blow-by does not affect the process at all when the operation is performed with 3 atm pressure.

At the end of the second stage, the components are in the following condition:

Tank J: Filled full with sand mixture

Tank J: Filled full with 3 atm (less blow-by) compressed air

[Third Stage]

Here, the precesses of the second stage are performed in a reverse fashion. Namely, the valves o and v of the tank $J_2$ are opened, the dome K and the compressor D are in operation, and the valve w is opened (valve t closed) to send compressed air to the tank $J_1$ and transfer the sand mixture up to the tank I through valves x and u in Added Pressure operation, while the sand mixture made in the dome K goes up into the tank $J_1$ in Natural Pressure operation.

By repeating the above process, it is possible to continuously transfer the mixture with extremely high efficiency. In order to further increase the efficiency, it is possible to add a tank $J_3$ and put three tanks to work in a similarly coordinated fashion, namely, in such a fashion that one cycle has 3 phases and one-third thereof is lagged constantly to be succeeded by the next. Using the above method, dredging and gathering minerals at deep water bottoms and collecting of submarine oil, which have been impossible so far, can be made possible. Currently, the most common dredging method is by sand pump boats. This method, however, is operable only down to 40 m at the deepest and for the mixture containing only around 10% of sand. Sand pumps used are of 4,000 to 10,000 horsepower.

In terms of cost, energy consumption, durability, and easy installment, the present method is incomparably superior to the current conventional method.

Embodiment 8—Water Transfer Facilities for Reservoirs

When performing water transfers with this method, it is necessary to prepare proper size pressure tanks appropriate to the scale of the operation. When constructing a large reservoir, it is desirable to construct guide slopes at the side and bottom in order that sand and pebbles flowing into the reservoir accumulate on a spot or spots on the bottom, and to build at the bottom a water-transfer device or a size appropriate to the scale of the operation, using reinforced concrete, etc. Alternate Added Pressure operation is preferred to be made in the water by the water-transfer device. If a dredging mechanism is also installed, the problem of sand accumulation can be resolved. Dredged sand can be used for any purpose efficiently. The water-transfer device is a semi-permanent device with a low probability of failure. It allows water transfer with much higher efficiency than Added Pressure operation in the open atmosphere.

Figure 12:
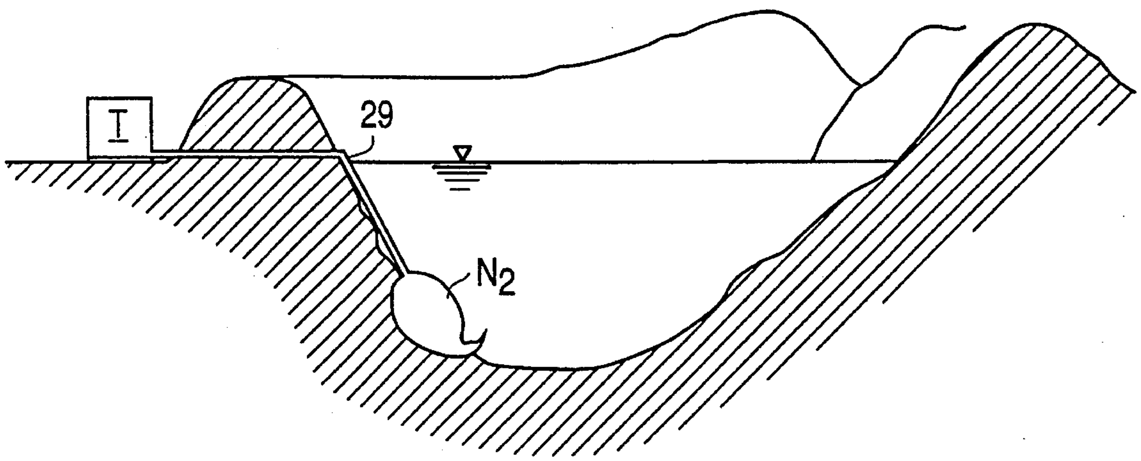
FIG. 12 illustrates an application of the present invention in an artificial reservoir.
Figure 13:
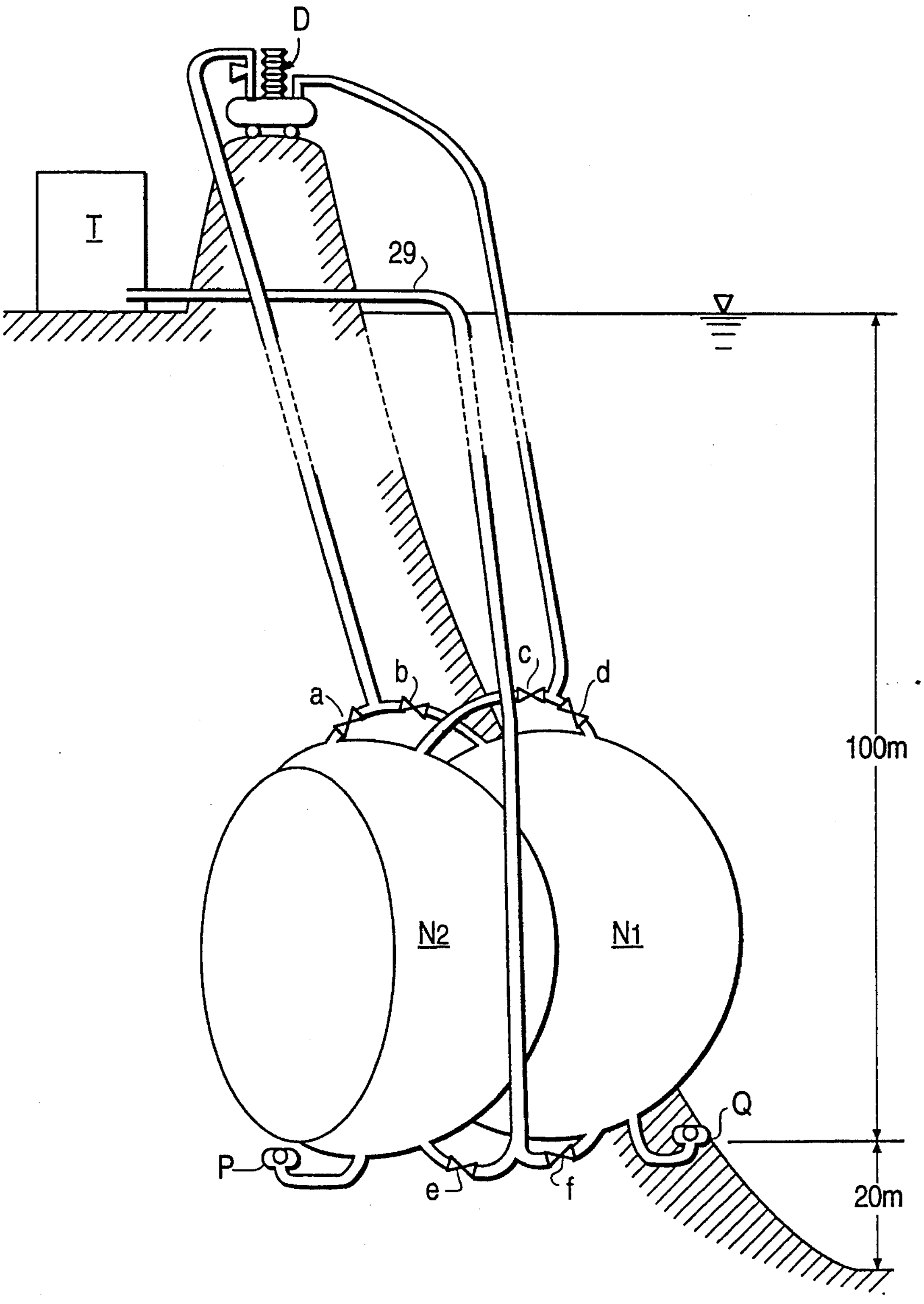
FIG. 13 illustrates an embodiment of the present method for drawing water from a reservoir.

FIG. 12 illustrates a cross-sectional view of an artificial reservoir surrounded by hills and banks. FIG. 13 shows a transfer method with pressure tanks made of reinforced concrete, close to the reservoir bottom, where the Alternate Added Pressure operation is applied.

A dredging mechanism is installed at a 120 m deep reservoir bottom, and a water-transfer device for conducting Alternate Added pressure operation is constructed with reinforced concrete at 100 m depth, after the rocks and sand are dug out. The main component of the device is a 2000 $m^3$ pressure tank which is divided into two equal parts $N_1$ and $N_2$, with a partition installed at the center of the tank. Both $N_1$ and $N_2$, therefore, have a capacity of 1000 $m^3$. This device has, as is shown in the drawing, six electrically-operated valves and anti-reflux valves P and Q attached to the bottom of $N_1$ and $N_2$. The body of each anti-reflux valve is ball-shaped, and its specific gravity is 0.9, slightly less than that of water. When the reservoir is 100 m deep, if the pressure inside $N_1$ is 10 atm or over on the gauge, the valve body sits on the valve seat and prevents any influx of water into the tank. If the pressure drops 0.1 atm or more below 10 atm, the valve body leaves the valve seat due to water pressure and water flows into the tank $N_1$. The valve body is naturally moved up and down by water pressure which corresponds to water depth. Therefore, if the reservoir level drops to 50 m from 100 m, the valves operate within a 0.1 atm range of 5 atm gauge pressure in order to alternately allow and prevent the influx of water.

The water surface of the reservoir is at the level of the flatland. Pipe 29, conveying water, is connected to water tank T through the bank.

[Preparatory Stage]

Pressure tank $N_1$: Filled with air at 10 atm gauge pressure

Pressure tank $N_2$: Filled with 1000 $m^3$ water (Pressure indicates gauge pressure from now on.)

[First Stage]

Compressed air of 10 atm in $N_1$ is applied in Added Pressure operation to $N_2$. More precisely, the valve d of the tank $N_1$ and the valve a of the tank $N_2$ are opened and the water in the tank $N_2$ is sent up through the valve e to the water tank T on the ground.

The pressure in the tank N drops as the compressed air flows into the tank $N_2$ and when it reaches the point where the pressure is 0.1 atm below 10 atm, the valve body of the valve Q provided at the tank $N_1$ is pushed down by the 10 atm water pressure and water flows in. The 10 atm water acts in a fashion equivalent to a hydraulic instrument, due to Pascal's principle, and generates the enormous upward force arising from the bottom of $N_1$, so that the whole process of Added Pressure operation is conducted with 10 atm. The moment the water in $N_2$ is all sent up to $N_1$ and the tank $N_2$ is filled with 10 atm compressed air, the tank $N_1$ is filled with 1000 $m^3$ of water.

[Second Stage]

Added Pressure operation is performed in a reverse fashion, with compressed air flowing to $N_1$ from $N_2$.

By repeating the above process, Alternative Pressure operation continues until the water lever drops and reaches the site of the valves P and Q of 100 m below the water surface. In this method, the whole process of Added Pressure operation is performed with 10 atm pressure. Blow-by from the compressor on the bank is the only loss, which can be supplemented by atmospheric pressure or compressed air from a receiver tank.

The efficiency of this method is quite high. Though it might seem to have an efficiency of over several hundred percent when a large volume of water is transferred, that is, the water level is close to the upper level of the capacity, it is constantly 100%. This is because is involves a transfer of ater, and not dredging. No energy is required to transfer water 100 m deep to the water's surface. Initially, when the water surface is at the same level at the flatland below the bank, the water flows into the water tank T through the pipe 29 and requires no energy for the transfer. When the water lever drops by 10 m, the transfer process can be performed in Added Pressure operation with 9 atm water pressure, the efficiency of which is 100%. When the water lever is down to 50 m, it is still 100%. Because the amount of work L required for Added Pressure operation is:

L=V (Pm-Pc), wherein V is the volume of the transferable water,

Pm is the maximum pressure, and

Pc is the lowest intake pressure, then, in this case, L=V×5 atm. This equals the amount of work required to transfer V volume of water 50 m, namely the efficiency is 100%.

In a water transfer, the efficiency is not as high as in dredging. However, since it can send up the whole water, even the water close to the bottom, with constant 100% efficiency, it can be said that this is a highly advanced method in comparison with current conventional practices. Furthermore, the mechanism of the device is simple and therefore there is a much smaller risk of failure. Accordingly, it is so far unpredictably advantageous method in terms of installment costs, operating costs, durability, etc.

INDUSTRIAL APPLICABILITY

As explained above, the transfer methods in accordance with the present invention are most appropriate when transferring sludge-like liquids (such as fertilizers and mud), as well as water, to a high level point or points. For example, it is advantageously available when a diluted organic fertilizer is spread over a wide area of a mountain or forest.

Also, at conventional hydraulic power plant, water in the lower reservoir is pumped up to the upper reservoir utilizing excess electricity during the night. In accordance with the present invention, however, if all or part of the excess electricity is converted into an energy of compressed air by a compressor and stored in a huge pressure tank, water can be transferred from lower ponds to upper ponds by using the compressed air, and then the water transfer to related remote dams can be conducted with high efficiency, regardless of day or night, for long periods of time.

In water bottom dredging, minerals gathering or submarine oil collecting, such factors as water pressure, buoyancy, and pressure differences can be utilized, and then extremely efficient transfer of objects can be obtained.

I claim:

1. A method of transferring material from the bottom of a body of water, comprising:

a) providing a first tank submerged at a predetermined depth above the bottom and below the water surface;

b) providing a material source at the bottom subject to the ambient water pressure at the bottom and fluidly connected with said first tank;

c) transferring material from said material source at the bottom to said first tank by reducing the pressure in said first tank to a pressure lower than the ambient water pressure at said predetermined depth such that the ambient water pressure at the bottom forces the material up into said first tank; and d) transferring material from said first tank to a second tank under the force of compressed air until said first tank is substantially empty of material and full of compressed air, wherein said first tank is connected to a third tank and an air compressor, and said step of transferring material from the first tank to the second tank comprises said compressor transferring compressed air to said first tank from said third tank with the air compressor; and wherein said step of transferring material from said material source at the bottom comprises transferring the compressed air from said first tank to said third tank to reduce the pressure in said first tank.

2. The method of claim 1 and further comprising sequentially repeating steps c) and d) to continuously transfer material.

3. The method of claim 1, wherein said second tank and said compressor are located at the water surface.

4. The method of claim 1, wherein said third tank is located at the water surface.

5. The method of claim 4, and further comprising stirring the material in said first tank with compressed gas from a fourth tank during said step d).

6. The method of claim 1, wherein said material source comprises a dredging device and the material comprises dredged material from the bottom.

7. The method of claims 1, wherein said third tank is provided at said predetermined depth connected to said material source and said air compressor.

8. The method of claim 7, and further comprising:

e) transferring material from said material source at the bottom to said third tank by reducing the pressure in said third tank to a pressure lower than the ambient water pressure at said predetermined depth during said step d) by transferring the compressed air in said third tank to said first tank with said compressor; and f) transferring material from said third tank to said second tank by transferring air from said first tank to said third tank.

9. The method of claim 8, and further comprising repeating steps c)–f), with said step e) occurring during said step d), and said step f) occurring during said step c).

10. The method of claim 7, wherein said second tank and said compressor are located at the water surface.

11. The method of claim 7, wherein said material source comprises a dredging device and the material comprises dredged material from the bottom.

12. The method of claim 1, wherein said step of transferring material from said material source at the bottom to said first tank further comprises opening a first valve to communicate said first tank, having air therein at a pressure above atmospheric pressure, with said third tank, having air therein at atmospheric pressure.

13. The method of claim 12, wherein said step of transferring material from said first tank to said second tank further comprises closing the first valve, opening a second valve to communicate said third tank with said air compressor, opening a third valve to communicate said air compressor with said first tank and opening a fourth valve to communicate said first tank with said second tank.

14. The method of claim 13, and further comprising stirring the material in said first tank with compressed gas from a fourth tank during said step d), said fourth tank being connected with said air compressor.

* * * * *